US012585899B2

(12) United States Patent
Ledonne

(10) Patent No.: US 12,585,899 B2
(45) Date of Patent: Mar. 24, 2026

(54) AUTOMATED SECURE ALLOCATION OF SCANNING DEVICES

(71) Applicant: Datalogic IP Tech S.R.L., Calderara di Reno (IT)

(72) Inventor: Gabriele Ledonne, San Giovanni in Persiceto (IT)

(73) Assignee: DATALOGIC IP TECH S.R.L., Bologna (IT)

( * ) Notice: Subject to any disclaimer, the term of this patent is extended or adjusted under 35 U.S.C. 154(b) by 135 days.

(21) Appl. No.: 18/401,258

(22) Filed: Dec. 29, 2023

(65) Prior Publication Data

US 2025/0217609 A1      Jul. 3, 2025

(51) Int. Cl.
G06K 7/10          (2006.01)

(52) U.S. Cl.
CPC ..... G06K 7/10257 (2013.01); G06K 7/10366 (2013.01)

(58) Field of Classification Search
CPC ........... G06K 7/10257; G06K 7/10366; G06K 9/00288; G06F 21/03; G06F 21/04; G06F 21/33; H04L 63/10; G06Q 20/4015; G06Q 10/087
See application file for complete search history.

(56) References Cited

U.S. PATENT DOCUMENTS

| | | | |
|---|---|---|---|
| 2005/0086328 A1 | 4/2005 | Landram et al. | |
| 2009/0158423 A1 | 6/2009 | Orlassino et al. | |
| 2019/0163942 A1* | 5/2019 | Lavery ............. | G06K 19/06028 |
| 2021/0334489 A1* | 10/2021 | Hoggatt ............. | G06K 7/10207 |

* cited by examiner

*Primary Examiner* — Vernal U Brown
(74) *Attorney, Agent, or Firm* — The Juhasz Law Firm

(57)          ABSTRACT

A control device includes a processor to: receive encoded data from an optical and/or RF scan of a security token of a user; use a user data set to authenticate the encoded data; in response to successful authentication, use the user data set to identify a scanning device that supports a subset of functionality that the user is authorized to use from among a larger set of functionality that includes access to application routines, access to data and/or access to communication features; and transmit and indication of the subset of functionality to the identified scanning device to cause the identified scanning device to transition to an allocated state in which the identified scanning device is allocated to the user, and restrict the user to using the subset of functionality on the identified scanning device.

20 Claims, 12 Drawing Sheets

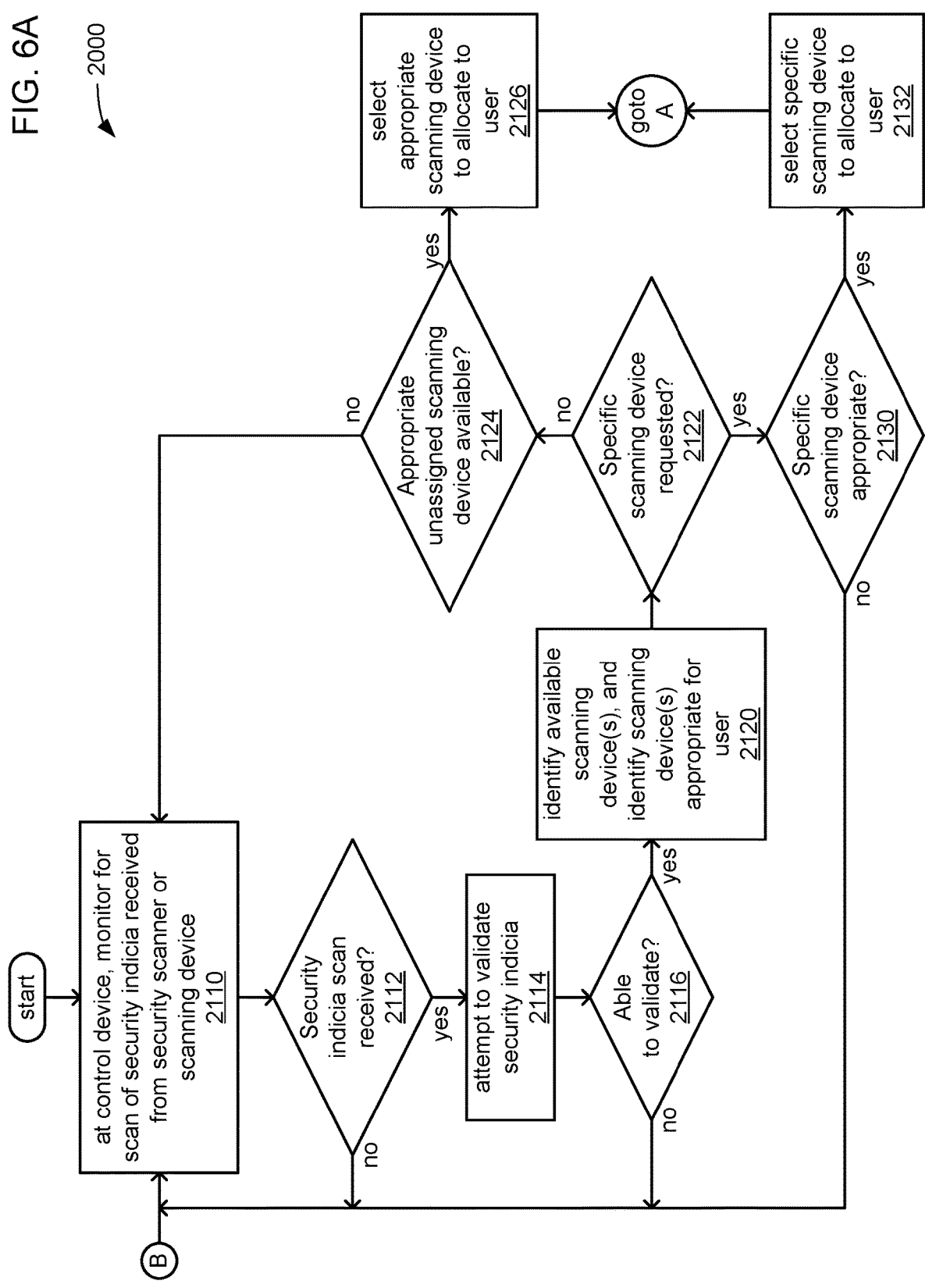

2000 start at control device, monitor for scan of security indicia received from security scanner or scanning device 2110

Security indicia scan received? 2112 no → B yes attempt to validate security indicia 2114

Able to validate? 2116 no yes identify available scanning device(s), and identify scanning device(s) appropriate for user 2120

Specific scanning device requested? 2122 yes

Specific scanning device appropriate? 2130 no yes select specific scanning device to allocate to user 2132 no

Appropriate unassigned scanning device available? 2124 no yes select appropriate scanning device to allocate to user 2126 goto A

AUTOMATED SECURE ALLOCATION OF SCANNING DEVICES

BACKGROUND

1. Technical Field

The present disclosure relates to the automated and secure allocation of portable scanning devices among authorized personnel.

2. Description of the Related Art

The application of encoded data markings that encode data (e.g., indicia such as barcodes, digital watermarks and/or human-readable text) to a surface of an object for subsequent capture and decoding to retrieve data encoded therein is well known. Also well known is the use of a portable scanning device incorporating a scanning engine to directly capture an image of such a surface in an effort to capture an image of one or more encoded data markings for decoding. Further well known is the use of such markings, together with such a portable scanning device in such activities as the transport, storage and inventorying of objects in various industries.

Such a scanning device may be a portable scanning device maintained at a location at which an object bearing one or more of such encoded data markings may be stored, through which such an object may be transported, at which such an object may be made available under various restrictions, and/or at which such an object may be offered for lease and/or sale. By way of example, such a scanning device may be carried by personnel at a warehouse to enable the capture of one or more encoded data markings carried on a surface of an object (e.g., a box, a crate, a palletized load, a documents folder, a piece of machine-readable media, etc.) as the object is transported into the warehouse, is stored within the portion of the warehouse, is retrieved from such storage and/or is transported out of the warehouse. Also by way of example, such a scanning device may be carried by personnel at a store, a performance venue or other place of business to enable the capture of one or more encoded data markings carried on a surface of an object as the object is transported thereto or therefrom, and/or is presented as part of an admission procedure (e.g., a package of a product that is being rented or purchased thereat, a package that is being delivered or is being picked up by a courier, a ticket that is being presented for admission to attend an event thereat, a ticket that is being presented to board transportation to another location, etc.). As still another example, such a scanning device may be carried by personnel in an office environment to enable the capture of one or more encoded data markings carried on a surface of an object as part of tracking the current location of the object and/or which personnel currently have possession of the object (e.g., a file folder or piece of machine-readable media containing sensitive client and/or patient information, etc.).

Also known is the need to maintain control over access to such a scanning device to prevent mistaken and/or malicious misuse. Such a scanning device is often linked to a server that stores information that is related to the data that is encoded within the encoded data markings that are carried on the surfaces of objects. It is often the case that the scanning device may retrieve portions of such stored information from the server as an input, along with the encoded data from encoded data markings, to performing various processing operations within the scanning device. This creates a need to control access to the scanning device as part of maintaining control over access to the information stored within server. Also, such a scanning device, itself, is often a relatively expensive device, and this creates a need to control physical access to the scanning device to prevent theft of the scanning device. This additionally creates a need to control the manner in which the scanning device is used to maximize the degree to which it is fully utilized.

Unfortunately, it is often the case that measures taken to control access to information and/or to the devices that rely on access to information can impose undue burdens on personnel leading to undesirable delays in completing various tasks. Similarly, measures taken to increase the efficient allocation and/or use of a resource, such as a scanning device, can also impose such burdens and/or delays. Thus, there is a need to provide an automated system for both the securing and efficient allocation of portable scanning devices among authorized personnel.

BRIEF SUMMARY

Technologies are described for making more efficient use of processing resources in identifying and quantifying differing types of barcode read failure in an automated barcode reading system.

A control device includes a first storage configured to store a user data set including: authorizations granted to each user of a set of users to use at least a subset of scanning devices of a set of scanning devices, wherein each scanning device of the set of scanning devices is capable of performing at least one of optical scanning of indicia and radio frequency (RF) scanning of radio frequency identification (RFID) tags; and authorizations granted to each user of the set of users to use at least a subset of application routines and communication features from among a set of application routines and communication features of each scanning device of the corresponding subset of scanning devices. The control device also includes a first processor communicatively coupled to the first storage, the first processor configured to perform operations including: receive indications of current status of the set of scanning devices; receive an indication of an occurrence of scanning of a security token comprising at least one of a security indicia able to be optically scanned and a security tag able to be RF scanned, wherein the at least one of the security indicia and the security tag comprises encoded data associated with a user; and attempt to use the user data set to authenticate the encoded data. The first processor is also configured to, in response to successful authentication of the encoded data, perform operations including: use the user data set to identify a scanning device of the set of scanning devices that the user is authorized to use; and transmit, from the control device and to the identified scanning device, at least an indication of the subset of application routines and communication features that the user data set indicates that the user is authorized to use to cause the identified scanning device to transition to an allocated state in which the identified scanning device is allocated to be used by the user, and restrict the user to using the subset of application routines and communication features on the identified scanning device.

A method includes: receiving, at a control device, by a first processor of a control device, and from a set of scanning devices, indications of current status of the set of scanning devices, wherein each scanning device of the set of scanning devices is capable of performing at least one of optical scanning of indicia and radio frequency (RF) scanning of radio frequency identification (RFID) tags; and receiving, at the control device and by the first processor, an indication of an occurrence of scanning of a security token comprising at least one of a security indicia able to be optically scanned and a security tag able to be RF scanned, wherein the at least one of the security indicia and the security tag comprises encoded data associated with a user. The method also includes attempting, by the first processor, to use a user data set to authenticate the encoded data, wherein the user data set is stored within a first storage communicatively coupled to the first processor, and the user data set includes: authorizations granted to each user of a set of users to use at least a subset of scanning devices of a set of scanning devices; and authorizations granted to each user of the set of users to use at least a subset of application routines and communication features from among a set of application routines and communication features of the corresponding subset of scanning devices. The method further includes, in response to successful authentication of the encoded data, performing operations including: using, by the first processor, the user data set to identify a scanning device of the set of scanning devices that the user is authorized to use; and transmitting, from the control device and to the identified scanning device, at least an indication of the subset of application routines and communication features that the user data set indicates that the user is authorized to use to cause the identified scanning device to transition to an allocated state in which the identified scanning device is allocated to be used by the user, and restrict the user to using the subset of application routines and communication features on the identified scanning device.

BRIEF DESCRIPTION OF THE DRAWINGS

FIGS. 6A and 6B provide a flowchart of operation of the scanning device of FIG. 1.

FIGS. 7A, 7B and 7C provide another flowchart of operation of the scanning device of FIG. 1.

DETAILED DESCRIPTION

Figure 1:
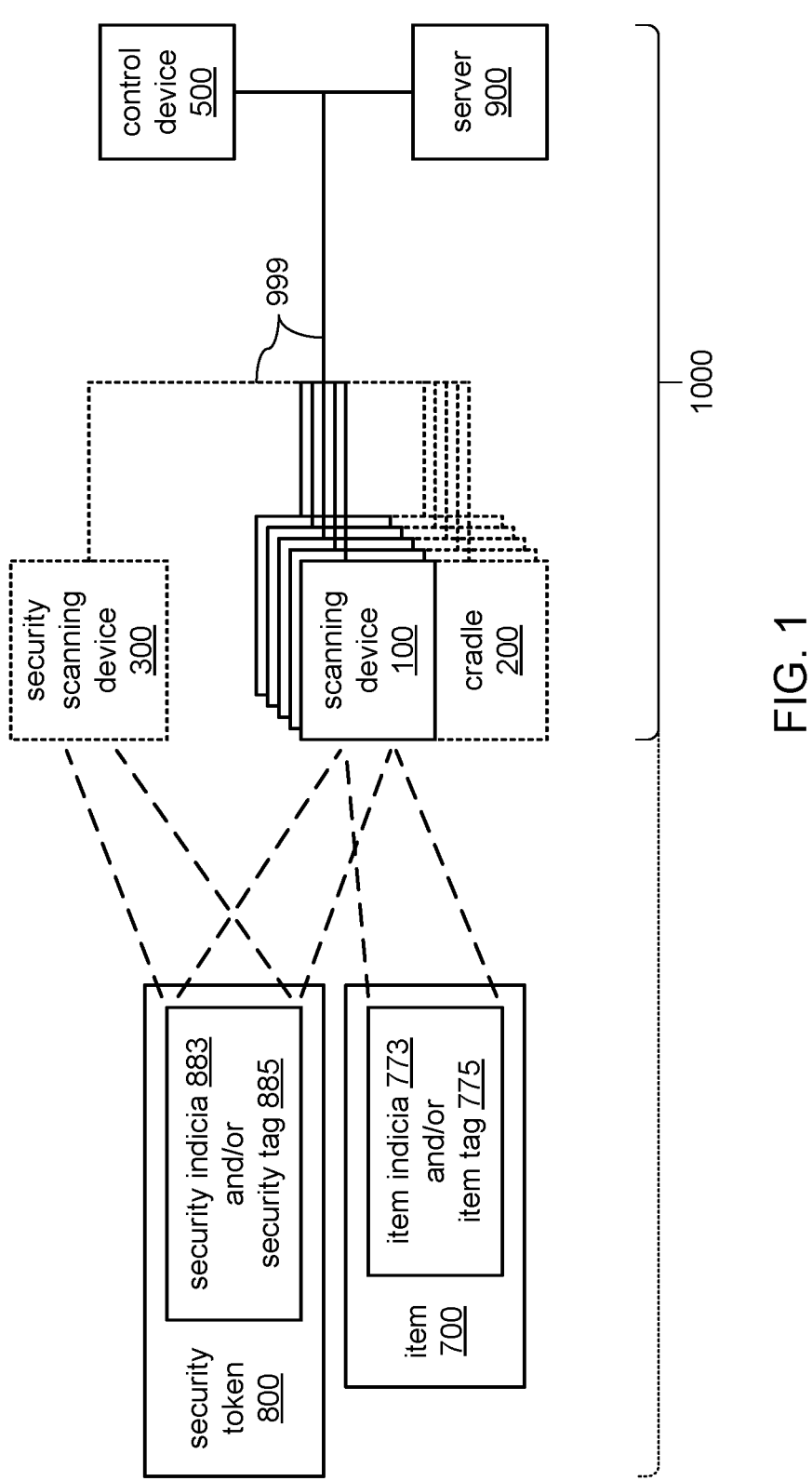
FIG. 1 is a block diagram of an embodiment of a decoding system.

In the following detailed description, reference is made to the accompanying drawings that form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Disclosed herein is a apparatus implementing a system and method for the automated and secure allocation of portable scanning devices among authorized personnel.

A control device includes a first storage configured to store a user data set including: authorizations granted to each user of a set of users to use at least a subset of scanning devices of a set of scanning devices, wherein each scanning device of the set of scanning devices is capable of performing at least one of optical scanning of indicia and radio frequency (RF) scanning of radio frequency identification (RFID) tags; and authorizations granted to each user of the set of users to use at least a subset of application routines and communication features from among a set of application routines and communication features of each scanning device of the corresponding subset of scanning devices. The control device also includes a first processor communicatively coupled to the first storage, the first processor configured to perform operations including: receive indications of current status of the set of scanning devices; receive an indication of an occurrence of scanning of a security token comprising at least one of a security indicia able to be optically scanned and a security tag able to be RF scanned, wherein the at least one of the security indicia and the security tag comprises encoded data associated with a user; and attempt to use the user data set to authenticate the encoded data. The first processor is also configured to, in response to successful authentication of the encoded data, perform operations including: use the user data set to identify a scanning device of the set of scanning devices that the user is authorized to use; and transmit, from the control device and to the identified scanning device, at least an indication of the subset of application routines and communication features that the user data set indicates that the user is authorized to use to cause the identified scanning device to transition to an allocated state in which the identified scanning device is allocated to be used by the user, and restrict the user to using the subset of application routines and communication features on the identified scanning device.

A method includes: receiving, at a control device, by a first processor of a control device, and from a set of scanning devices, indications of current status of the set of scanning devices, wherein each scanning device of the set of scanning devices is capable of performing at least one of optical scanning of indicia and radio frequency (RF) scanning of radio frequency identification (RFID) tags; and receiving, at the control device and by the first processor, an indication of an occurrence of scanning of a security token comprising at least one of a security indicia able to be optically scanned and a security tag able to be RF scanned, wherein the at least one of the security indicia and the security tag comprises encoded data associated with a user. The method also includes attempting, by the first processor, to use a user data set to authenticate the encoded data, wherein the user data set is stored within a first storage communicatively coupled to the first processor, and the user data set includes: authorizations granted to each user of a set of users to use at least a subset of scanning devices of a set of scanning devices; and authorizations granted to each user of the set of users to use at least a subset of application routines and communication features from among a set of application routines and communication features of the corresponding subset of scanning devices. The method further includes, in response to successful authentication of the encoded data, performing operations including: using, by the first processor, the user data set to identify a scanning device of the set of scanning devices that the user is authorized to use; and transmitting, from the control device and to the identified scanning device, at least an indication of the subset of application routines and communication features that the user data set indicates that the user is authorized to use to cause the identified scanning device to transition to an allocated state in which the identified scanning device is allocated to be used by the user, and restrict the user to using the subset of application routines and communication features on the identified scanning device.

FIG. 1 depicts an example embodiment of a decoding system 1000 that includes one or more of a set of multiple scanning devices 100, a corresponding set of cradles 200, a security scanning device 300, a control device 500, and/or a server 900. As also depicted, one or more of the scanning devices 100, the cradles 200, the security scanning device 300, the control device 500 and/or the server 900 may be interconnected by a network 999.

Importantly, in reference to the scanning devices 100 and to the security scanning device 300, the terms "scan" and "scanning" are meant to refer to using either light to perform an optical scan of indicia (e.g., human-readable text, barcodes, QR codes, watermarks, etc.) present on a surface, or using electromagnetic fields and/or radio frequency (RF) transmissions to perform an RF scan of radio frequency identification (RFID) tags, or both. Thus, it should be clear that various different embodiments of the scanning devices 100 and/or the security scanning device 300 may be capable of performing either type of scan or both types of scan.

As will be explained in greater detail, in the decoding system 1000, at least the scanning devices 100 may be operated at a worksite by authorized personnel to scan item indicia 773 and/or item tags 775 carried by any of a variety of types of items 700, and to decode data that may be encoded within the item indicia 773 and/or item tags 775. Such scanning may be performed as part of tracking and/or taking other actions regarding the current disposition of the items 700. In so doing, each of the scanning devices 100 may cooperate with the server 900 through the network 999 to access various pieces of data stored within the server 900, and/or to provide the server 900 with the decoded data.

As will also be explained in greater detail, in the decoding system 1000, a form of automated allocation of the scanning devices 100 to the authorized personnel may be performed that is based on scans of security indicia 883 and/or security tags 885 incorporated into security tokens 800 carried by the authorized personnel. Such scanning may be performed to uniquely identify each authorized user of a scanning device 100 among the authorized personnel. Such individual identification of authorized users may be employed to control physical access to the scanning devices 100, and/or to control the particular set of functions and/or particular data that each authorized user is granted access to through use of a scanning device 100.

More specifically, for each authorized user, there may be a user a profile maintained by the control device 500 that specifies what functions that user is authorized to perform with a scanning device 100 and/or what limitations that user is subject to in accessing data stored on the server 900 through a scanning device 100. It may be that there are differences among such authorizations to perform functions and/or access data between different authorized users. In some embodiments, the variety of functions that a user may or may not be authorized to perform may include one or more application routines that user is authorized to use with a scanning device 100, and/or the variety of functions that a user may or may not be authorized to perform may include one or more communication features of the scanning devices

100 (e.g., telephone communications, texting, accessing websites, using WiFi communications in lieu of or in addition to cellular communications, etc.). Whether a particular user is authorized to use an application routine and/or whether a particular user is authorized to use a communication feature may be customized for each user who is allocated a scanning device 100 by the control device 500 via the network 999. Thus, based on a scan of a security token 800 carried by a particular authorized user, indications of the details of what that user is authorized to do and/or to access with a scanning device 100 may be downloaded into one of the scanning devices 100, and that user may be granted access to that scanning device 100.

Additionally, in some embodiments, there may be a requirement that a form of two-factor authentication be used in at least some situations to unlock a scanning device 100. By way of example, it may be that the allocation of a scanning device 100 to an authorized user requires the entry of a password or scan of a fingerprint in addition to a scan of that user's security token 800, such that there are two factors required to be used in allocating a scanning device. Later, after the elapsing of an initial pre-determined period of time of inactivity, that scanning device 100 may lock itself to a limited degree to at least prevent unauthorized use, and that particular user may then simply need to use one of the two factors (e.g., either scanning the security token 800, or the other factor) to unlock it the scanning device 100, again. However, if the period of activity continues for another pre-determined period of time, then two-factor authentication may again be required to unlock that scanning device 100. Indeed, it may be that the scanning device 100 becomes unallocated such that the use of factors of the two-factor authentication is required to cause the scanning device to become allocated to the user, again.

Still further, in some embodiments, it may be possible to change the authorized user to which a particular scanning device 100 is allocated to through use of at least a security token 800. More precisely, where a scanning device 100 has been allocated to a first authorized user, it can be reallocated to a second authorized user in response to the second authorized user using the scanning device 100 to scan the security token 800 carried by the second authorized user. However, it should be noted that, in some embodiments, it may be that two-factor authentication may be required, such as entry of a password or scan of a fingerprint of the second authorized user.

Figure 2A:
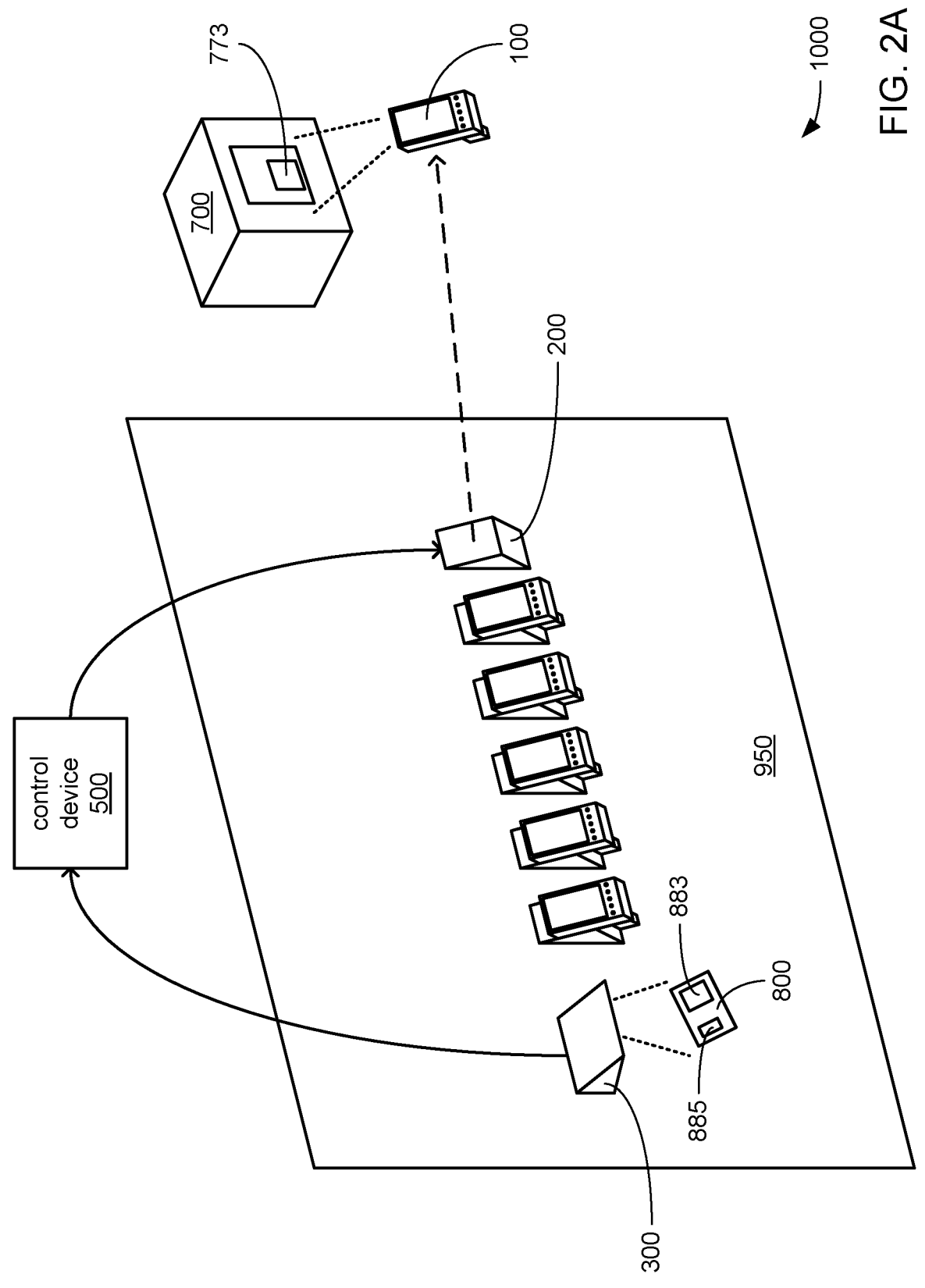
FIGS. 2A and 2B provide perspective views of differing embodiments of the decoding system of FIG. 1.
Figure 2B:
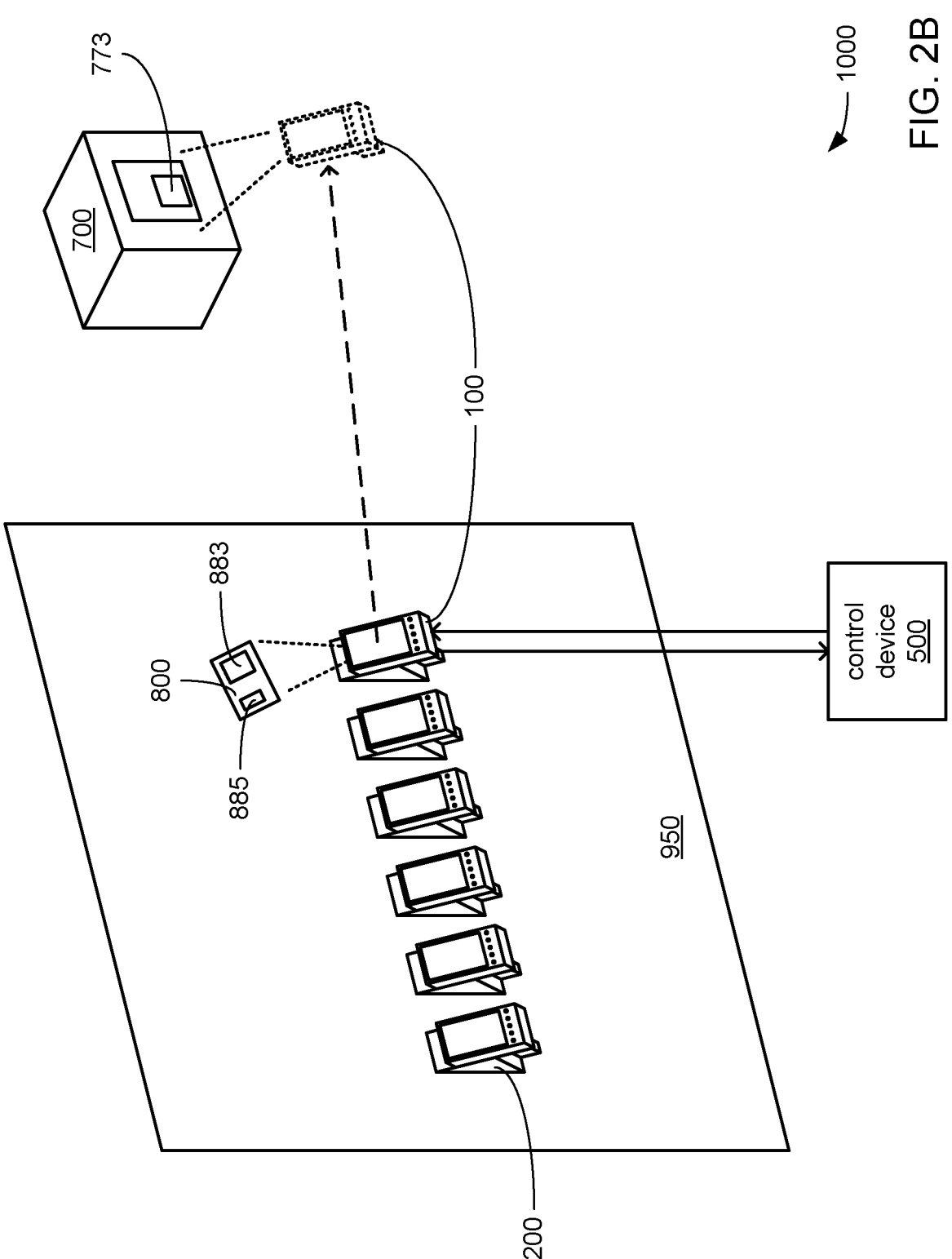

FIGS. 2A and 2B depict two different example embodiments of operation of the decoding system 1000 of FIG. 1 to allocate a scanning device 100 to an authorized user. As depicted in both embodiments, the set of cradles 200 may be mounted to a wall 950 (or other portion of) of a worksite at which the set of scanning devices 100 are used.

Turning to FIG. 2A, in embodiments of the decoding system 1000 that include the security scanning device 300, a security token 800 that is carried by a user may be positioned near the security scanning device 300 for being scanned thereby. As depicted, the security token 800 may be a card or badge having a surface on which a security indicia 883 (e.g., a barcode, a QR-code, text, watermark, etc.) may be carried such that it is able to be optically scanned by the security scanning device 300. The indicia 883 may encode a data value that serves as a security credential that is associated with the authorized user. Alternatively, as also depicted, the security token may incorporate a security tag 885 (e.g., a radio-frequency identification (RFID) tag) that is able to be subjected to RF scanning in which the security tag 885 is wirelessly provided with electric power by an electromagnetic field emanating from the security scanning device 300. Similarly to the security indicia 883, the security tag 885 may store a data value that serves as a security credential, and may respond to being wirelessly powered by the magnetic field by wirelessly transmitting that data value for being received by the security scanning device 300.

Regardless of the exact manner in which the security token 800 is scanned by the security scanning device 300 to retrieve a security credential therefrom (i.e., either by optical scanning or RF scanning), the security credential may be relayed to the control device 500 via the network 999. Presuming that the security credential is able to be authenticated, the control device 500 may select an available one of the scanning devices 100 that is locked into place with its corresponding cradle 200 to allocate to the user. As will be explained in greater detail, this selection of an available scanning device 100 may be at least partially based on what functions that are authorized for the user to perform and/or what data the user is authorized to have access to. Alternatively or additionally, this selection of an available scanning device 100 may be at least partially based on one or more aspects of the current status of each of the available scanning devices 100 that may be locked into place with a corresponding cradle 200, such as the degree to which the battery within each is charged.

Regardless of the exact manner in which the selection of scanning device 100 is made, and as will be explained in greater detail, the control device 500 may then transmit a signal to either the selected scanning device 100 or its corresponding cradle 200 to unlock the selected scanning device 100 from the cradle 200, thereby granting physical access to the selected scanning device 100 to the user. It should be noted that, in embodiments in which two-factor authentication is required in allocating a scanning device 100, the user may be required to operate either the security scanning device 300 or the selected scanning device 100 to provide another security credential, such as the entry of a password, a scan of a fingerprint, etc.

Turning to FIG. 2B, in embodiments of the decoding system 1000 that do not include the security scanning device 300, a security token 800 carried by a user may be positioned near one of the available scanning devices 100 still locked in place with its corresponding cradle 200 for being scanned thereby. The security credential that is retrieved from the scanning of the security token 800 may then be relayed by that scanning device 100 to the control device 500 via the network 999.

Again, presuming that the security credential is able to be authenticated by the control device 500, the control device 500 may select an available one of the scanning devices 100 that is locked into place with its corresponding cradle 200 to allocate to the user. However, unlike what was discussed concerning the selection of an available scanning device 100 in FIG. 2A, in FIG. 2B, an additional factor employed in selecting an available one of the scanning devices 100 to allocate to the user may be the choice of which scanning device 100 the user used to scan their security token 800. Thus, it may be that, unless the user chose a scanning device 100 that does not match the particular range of functions that the user is authorized to perform, and/or is in some other way of a type that the user is not authorized to use, then the control device 500 may select another one of the available scanning devices 100 that is more appropriate for the user. Alternatively or additionally, it may be that the battery within the scanning device 100 that the user used to scan their security token 800 is determined by the control device 500 to be too depleted to allocate that scanning device 100 for use by any of the authorized personnel, then the control device 500 may select another one of the available scanning devices 100 to allocate to the user.

Again, regardless of the exact manner in which the selection of scanning device 100 is made, the control device 500 may then transmit a signal to either the selected scanning device 100 or its corresponding cradle 200 to unlock the selected scanning device 100 from the cradle 200, thereby granting physical access to the selected scanning device 100 to the user. Again, it should be noted that, in embodiments in which two-factor authentication is required in allocating a scanning device 100, the user may be required to operate either the selected scanning device 100 or the scanning device 100 that the user used to scan their security token 800 (if different from the selected scanning device 100) to provide another security credential, such as the entry of a password, a scan of a fingerprint, etc.

Figure 3A:
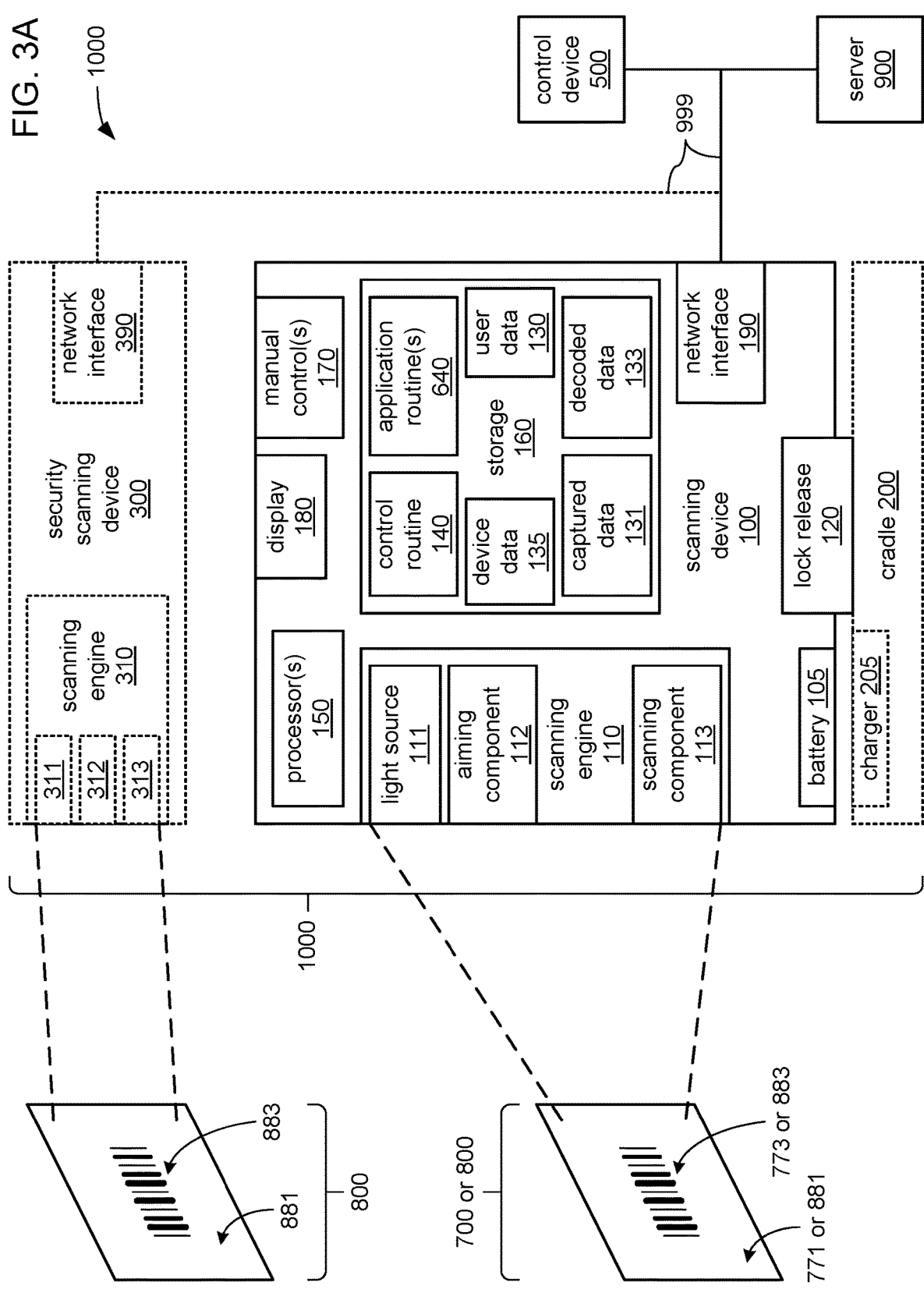
FIGS. 3A and 3B provide block diagrams of differing embodiments of scanning devices and cradles of the decoding system of FIG. 1.
Figure 3B:
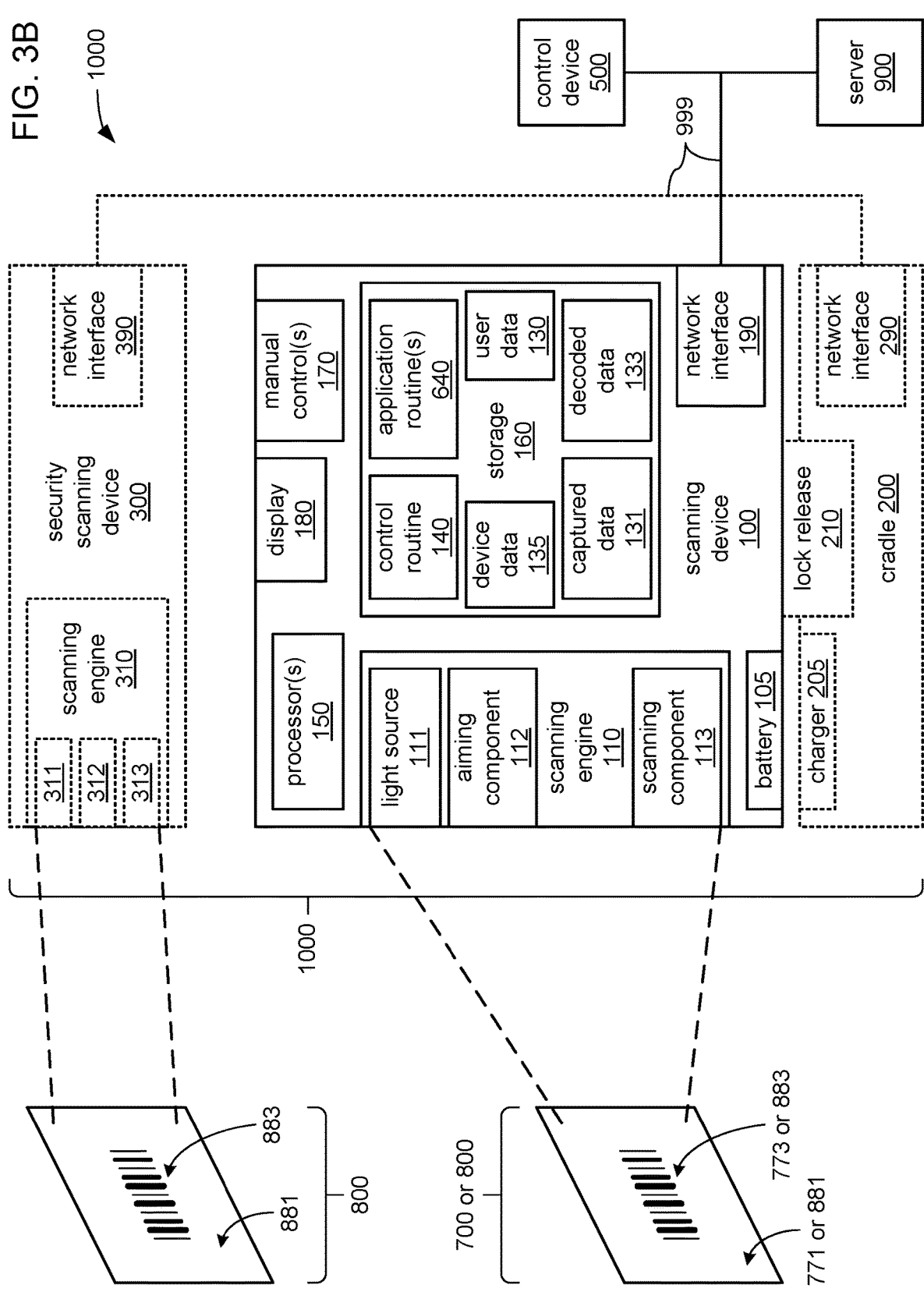

FIGS. 3A and 3B depict two different example embodiments of both the scanning device 100 and the cradle 200 in greater detail.

Turning to FIG. 3A, as depicted, each of the scanning devices 100 may include a battery 105, a scanning engine 110, a lock release 120, one or more processors 150, a storage 160, one or more manually-operable controls 170, a display 180, and/or a network interface 190. The scanning engine 110, the lock release 120, the storage 160, the manually-operable control(s) 170, the display 180, and/or the network interface 190 may each be communicatively coupled to the one or more processors 150 to exchange data therewith through the exchange of electrical, optical, magnetic and/or other signals through one or more buses and/or other form of interconnect.

The storage 160 may store user data 130 concerning a user who may be currently authorized to use a scanning device 100, captured data 131 representing data captured from an object 700 or a security token 800 using the scanning engine 110, decoded data 133 representing a decoded form of the captured data 131, and/or device data 135 descriptive of various characteristics of a scanning device 100. The storage 160 may also store a control routine 140, and/or one or more application routines 640.

Turning to FIG. 3B, the embodiments of the scanning device 100 and corresponding cradle 200 depicted in FIG. 3B are substantially similar to those depicted and just discussed in reference to FIG. 3A. However, in FIG. 3B, instead of the scanning device 100 incorporating a lock release, it is the cradle 200 that incorporates a lock release 210. Additionally, in FIG. 3B, the cradle 200 additionally incorporates a network interface 290 by which the cradle 200 may receive a command via the network 999 to operate the lock release 210 to enable the depicted scanning device 100 to be separated from the cradle 200, as will shortly be explained in greater detail.

Figure 4:
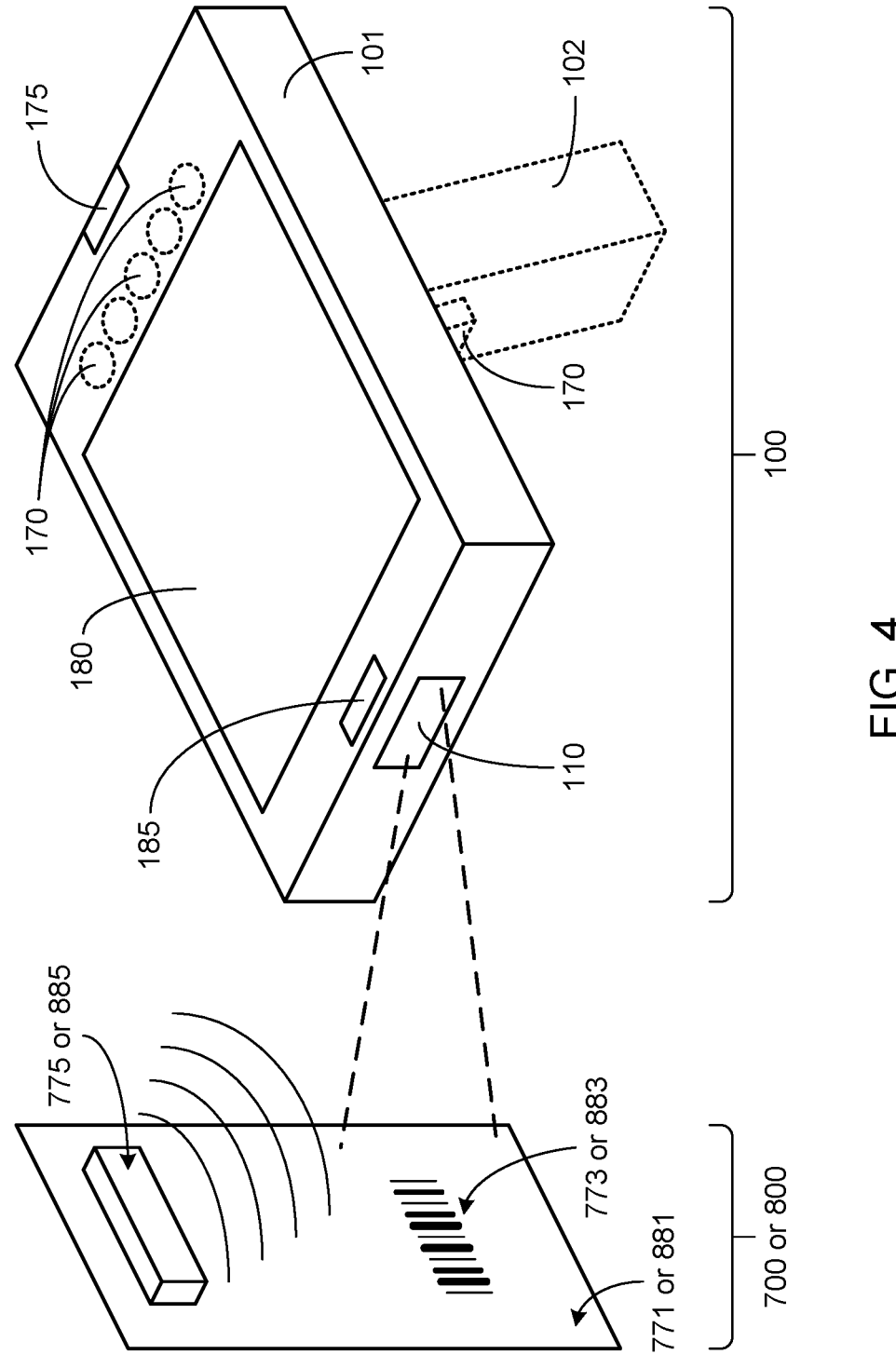
FIG. 4 is a perspective view of an embodiment of either of the scanning devices of FIGS. 3A and 3B.

FIG. 4 depicts an example physical configuration of an embodiment of the scanning device 100 of either FIG. 3A or 3B. In this physical configuration, the scanning device 100 may have a casing made up of a relatively flat main portion 101 that may have a shape and/or size that resembles a typical smart phone, and that carries at least the scanning engine 110, one or more manually-operable controls 170 and the display 180. Connected to, and projecting from, the main portion 101 may be an elongated handle portion 102 that may have a shape and/or size that resembles the grip portion of a gun, and that carries a single manually-operable control 170 at a location therealong that resembles the trigger of a gun.

In some embodiments in which a scanning device 100 has such a physical configuration, in may be that the scanning device incorporates at least some of the communications features often provided by typical smart phones, including and not limited to, voice communications via either cellular networks or wireless data networks (e.g., WiFi, WiMax, Bluetooth, etc.), text messaging, access to websites and/or FTP sites, etc. Thus, as depicted, it may be that such an embodiment a scanning device 100 additionally incorporates a microphone 175 and speaker 185 to enable two-way voice communications. Alternatively or additionally, the manually-operable controls 170 may of a type and/or physical arrangement as to provide a keypad for dialing phone numbers and/or texting. As another alternative, the display 180 may incorporate touch screen functionality to better enable the entering of text. Various different ones of such communication features may or may not require the downloading of application routine 640.

Figure 5:
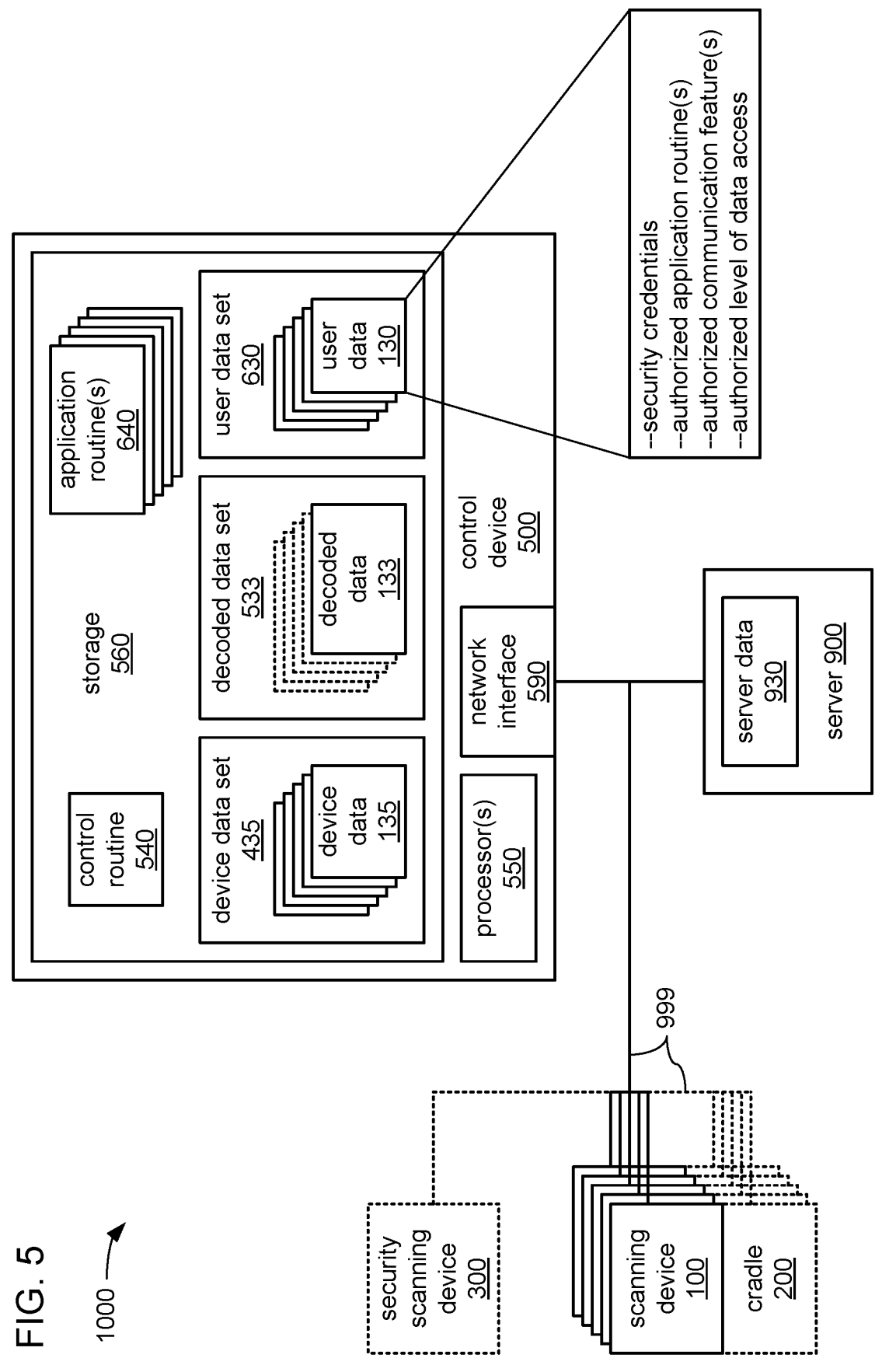
FIG. 5 is a block diagram of an embodiment of a control device of the decoding system of FIG. 1.

FIG. 5 depicts an example embodiment of the control device 500 of the decoding system 1000 of FIG. 1 in greater detail. As depicted, the control device 500 may include a one or more processors 550, a storage 560, and/or a network interface 590. The storage 560, and/or the network interface 590 may each be communicatively coupled to the one or more processors 550 to exchange data therewith through the exchange of electrical, optical, magnetic and/or other signals through one or more buses and/or other form of interconnect.

The storage 560 may store a device data set 435, a decoded data set 533, and/or a user data set 630. The storage 560 may also store a control routine 540, and/or multiple application routines 640. The device data set 435 may include multiple pieces of device data 135 received from each of the scanning devices 100, the decoded data set 533 may include multiple pieces of decoded data 133 received from each of the scanning devices 100, and the user data set 630 may include multiple pieces of user data 130 concerning multiple individual users who are each authorized to use one or more of the scanning devices 100.

Referring back to FIGS. 3A-B and 5, each of the control routines 140 and 540 may incorporate a sequence of instructions operative on corresponding ones of the processor(s) 150 and 550 to implement logic to perform various functions.

Within each scanning device 100, at a time when it is not currently allocated to a user, execution of the control routine 140 may cause the processor(s) 150 of the scanning device 100 to await being allocated to a user. During that time, the processor(s) 150 may be caused to recurringly operate the network interface 190 to transmit, to the control device 500 via the network 999, an instance of the device data 135 indicating at least the current status of the scanning device 100. By way of example, the transmitted instance of the device data 135 may include an indication of the current condition of the battery 105. In embodiments of the decoding system 1000 that include the set of cradles 200, the transmitted instance of the device data 135 may include an indication of whether or not the scanning device 100 is currently locked in place with a cradle 200 and/or an identifier of that particular cradle 200. In this way, the control device 500 may be provided with repeatedly updated information concerning which ones of the scanning devices 100 are currently available and/or in condition for being allocated to authorized users.

Within the control device 500, execution of the control routine 540 may cause the processor(s) 550 of the control device 500 to operate the network interface 590 to monitor the network 999 for the receipt of instances of the device data 135 from each of the scanning devices 100 that are each not currently allocated to a user. These received instances of device data 135 may be stored as part of the device data set 435, thereby creating a recurringly updated set of indications of at least which scanning devices 100 are currently not allocated to authorized users, as well as details of the condition of each.

In embodiments of the decoding system 1000 that include the security scanning device 300, execution of the control routine 540 may cause the processor(s) 550 of the control device 500 to operate the network interface 590 to monitor the network 999 for the receipt of an indication of a security token 800 having been scanned by the security scanning device 300. Such an indication from the security scanning device 300 may include an instance of decoded data 133 that includes a copy of data serving as a security credential retrieved and decoded from a security indicia 883 or a security tag 885 of the security token 800. The processor(s) 550 may store the received instance of decoded data 133 within the decoded data set 533. Also, the processor(s) 550 may attempt to authenticate the security credential conveyed in the received instance of decoded data 133. More precisely, an indication within the received instance of decoded data 133 may be used to refer to instances of user data 130 stored within the user data set 630 to determine whether there is a match to an authorized user. Presuming there is a match to an instance of user data 130 within the user data set 630 for an authorized user, then the security credential within the received instance of decoded data 133 may be checked against security credential verification information stored within that instance of user data 130 to validate it.

It should be noted that, in some embodiments, there may be a requirement for the use of two-factor authentication in which the security token 800 would not, by itself, be sufficient for a user to have a scanning device 100 allocated to them. By way of example, in such embodiments, it may be additionally necessary to also enter a password and/or to provide a scan of a finger print using the security scanning device 300. In such embodiments, the same instance of user data 130 may also be used to validate such an entered password or fingerprint.

Regardless of whether two-factor authentication is required, and presuming that validation is successful, then the processor(s) 550 of the control device 500 may be caused by further execution of the control routine 540 to refer to the instances of device data 135 stored within the device data set 435 to identify which ones of the scanning devices 100 are not currently allocated such that they are available. The processor(s) 550 may then be further caused to select a scanning device 100 from among the available scanning devices 100 to be allocated to that user. As previously discussed, it may be that factors affecting the degree to which a scanning device 100 is currently in a condition to be allocated to a user that are used as a basis for making the selection, such as the degree to which its battery 105 is currently charged.

However, in some embodiments, the factors taken into account in making the selection of which scanning device 100 to allocate to a particular user may include combinations of aspects of what functions and/or data the user is authorized to have access to and/or what functions each scanning device 100 is configured to perform. In such embodiments, it may be that each instance of user data 130 stored within the user data set 630 includes indications of what functions each user is authorized to perform and what portion(s) of the server data 930 each user is authorized to have access to.

Each such function and/or each portion of the server data 930 for which a user may be authorized may correlate to which one(s) of the application routines 640 that a particular user is authorized to use and/or to which communication features a particular user is authorized to use. In this way, for each user, one of the instances of user data 130 may specify a particular subset of application routines 640 and/or communication features that they are authorized to use. Depending on the combinations of aspects, the selection of which application routine(s) 640 and/or communication features a particular user is authorized to use may correlate to which one of multiple differing models of scanning device 100 is needed to accommodate those application routine(s) 640.

By way of example, where a user has authorizations to perform relatively few and/or relatively simple functions that require little more than scanning item indicia 773 and/or item tags 775 carried by items 700, and conveying the instances of decoded data 133 for those scans to the server 900 for storage, then a relatively simple model of scanning device 100 may be appropriate to allocate to that user. This may be the situation where the instance of user data 130 for that user identifies that user as a warehouse worker who is usually involved in moving and/or storing items 700. The subset of application routine(s) 640 and/or communication features that such a user is authorized to use may actually include no authorization to use any application routines 640, and perhaps push-to-talk voice communications within the worksite may be the only communication feature that such a user is authorized to use.

However, and by way of another example, where a user has authorization to perform more functions and/or relatively complex functions that require access to a relatively large portion of the server data 930 stored on the server 900 and/or that require the performance of various calculations and/or other data operations, then a more capable model of scanning device 100 that is able to execute a relatively large variety of application routines 640 and/or that provides a relatively large variety of communication features may be the most appropriate scanning device 100 to allocate to that user. This may be the situation where the instance of user data 130 for that user identifies that user as a manager of inventory such that he or she must evaluate quantities of items 700 to keep on hand for manufacturing purposes. Such a user may need to make use of application routines 640 that enable various forms of scheduling management and/or coordination of material transport to be viewed and/or modified using a scanning device, and/or such a user may need to occasionally participate in international audio and/or video calls to converse with others about such matters.

Regardless of the exact manner in which a scanning device 100 is selected for a particular user who has scanned their security token 800 using the security scanning device 300, the allocation of that selected scanning device 100 may entail the processor(s) 550 of the control device 500 operating the network interface 590 to transmit a command to the selected scanning device 100 to unlock itself for use by that user. In embodiments of the decoding system 1000 that does not include the set of cradles 200, such a command to the selected scanning device 100 may trigger the processor(s) 100 thereof to become response to the manually-operable control(s) 170 thereof to accept user input, and thereby allow the user to interact with it. However, in other embodiments of the decoding system 1000 that do include the set of cradles 200, then unlocking the selected scanning device 100 may include triggering a physical unlocking of the selected scanning device 100 from a corresponding cradle 200. In the embodiment of FIG. 3A, the command to the selected scanning device 100 to unlock itself may additionally trigger the selected scanning device 100 to operate its lock release 120 to disengage from its corresponding cradle to allow the scanning device 100 to be removed therefrom by the user. However, in the embodiment of FIG. 3B, a separate unlocking command may need to be transmitted to the corresponding base to cause operation of its lock release 210 to disengage from the selected scanning device 100.

In some embodiments, the instances of device data 135 received from each of the scanning devices 100 by the control device 500 may include indications of which application routine(s) 640 are currently installed within the storage 160 of each scanning device 100. Thus, where a scanning device 100 is being allocated to a user, but does not already have copies of all of the application routines 640 that are needed to enable that user to use that scanning device 100 to do the work they are authorized to do, then copies of those application routines 640 may be downloaded from the control device 500 and into the storage 160 of that scanning device 100 via the network 999.

In embodiments of the decoding system 1000 that do not include the security scanning device 300, it may be necessary for a user to locate an available scanning device 100 (whether it is currently locked to a cradle 200, or not) and use it to scan their security token 800 as a way to cause that particular scanning device 100 to be allocated to them. Within that scanning device 100, execution of control routine 140 may cause processor(s) 150 thereof to determine that the user is attempting to request having that scanning device 100 allocated to them based at least on the fact of that scanning device 100 not currently being allocated to any user. In response to such a determination, that scanning device 100 may scan, decode and relay an instance of decoded data 133 that includes the security credential from that security token 800 to the control device 500 for authentication in a manner similar to what the security scanning device 300 would do.

However, presuming that authentication is successful, then one of the factors that may be included in selecting a scanning device 100 to allocate to that user may be the fact of which scanning device 100 the user chose to use to scan their security token 800. It may be presumed that the user is knows which model(s) of the scanning device 100 are appropriate for he or she to use based on what functions they are authorized to perform. Thus, it may be that, by default, the user is allocated the very same scanning device 100 that the user used to scan their security token 800.

However, it may be that the scanning device 100 just used by that user for scanning their security token 800 is not a model that is able to perform all of the functions that the user is authorized to perform. That particular scanner make lack necessary data storage capacity, necessary processing resources, necessary scanning features, etc. In such a situation, it may be that an indication of the limitations of that scanning device 100 is transmitted to that scanning device 100, and the processor(s) 150 thereof are caused to operate the display 180 to display a notice of such limitations. Alternatively or additionally, an indication may be transmitted to that scanning device 100 for presentation on the display 180 that the user cannot be allowed to use that scanning device 100 allocated to them, and that they must identify and re-scan their security token 800 with another scanning device 100 that is more appropriate for their needs.

In some embodiments, the command to the selected scanning device 100 from the control device 100 to unlock itself may be accompanied by at least a portion of the instance of user data 130 for the user being downloaded via the network 999 to the selected scanning device 100. Such a portion may include enough information concerning security credentials associated with the user to allow the user re-authenticate with the scanning device, by itself, in a situation in which a long enough period of inactivity has elapsed in using that scanning device 100 that the scanning device 100 has locked itself. Again, different levels of authentication may be required to once again unlock the scanning device depending on the length of time of the inactivity (e.g., single-factor authentication vs. two-factor authentication).

Continuing to refer back to FIGS. 3A-B and 5, the battery 105 may be any of a variety of types of electrical power storage component, including and not limited to, a battery made up of one or more cells that may be rechargeable and/or may be removable. Also, the battery 105 may be based on any of a variety of electrical power storage technologies, including and not limited to, nickel-cadmium, nickel metal hydride (NiMH), lithium-ion, lithium polymer, sodium-ion, etc. In some embodiments, while a scanning device 100 is locked into place with a corresponding cradle 200, it may be that a charger 205 of the cradle provides electric power to the scanning device 100 to enable recharging of the battery 105 in place within the scanning device.

The scanning engine 110 may incorporate a scanning component 113 that may be based on any of a variety of technologies and may employ any of a variety of optical scanning and/or other image capturing techniques to capture image(s) of encoded data marking(s) 773 and/or 883 (e.g., indicia, digital watermarks and/or text) carried on a surface 771 and/or 881 of a portion of an object 700 and/or security token 800, respectively. More specifically, the scanning component 113 may be any of a variety of light sensing components that effect the capture of an image that may include encoded data marking(s) 773 and/or 883, including and not limited to, a charge-coupled device (CCD) or complementary metal-oxide-semiconductor (CMOS) sensor providing a single row of individual light sensors operated in a manner that sweeps over encoded data markings to perform a scan thereof, or a CCD or CMOS sensor providing a two-dimensional (2D) array of individual light sensors to capture a 2D image of one or more encoded data markings. In some embodiments, the scanning engine 110 may additionally incorporate, or be otherwise accompanied by, any of a variety of optical components (e.g., lenses, mirrors, color-adjusting gels, etc.—not specifically shown) that may manipulate the light arriving at the scanning engine 110 from within the filed of view (FOV) of the scanning engine 110 in any of a variety of ways before it reaches the scanning component 113.

The scanning engine 110 may additionally incorporate an aiming component 112 that projects one or more visual aiming guides onto the surface 771 and/or 881 of the object 700 and/or security token 800 within and/or near the FOV of the scanning engine 110 to aid a user of the scanning device 100 in maneuvering the scanning device 100 to cause the encoded data marking 773 and/or 883, respectively, to be positioned within the FOV in preparation for being captured. An example of such a visual guide may be the single depicted dot-shaped visual guide (not specifically shown), which may be generated by a combination of a lighting component (e.g., a light-emitting diode or an incandescent bulb) and a lens. Another alternate example of such a visual guide may be a cross-shaped visual guide (not specifically shown) that may be generated by one or more laser diodes.

The scanning engine 110 may further incorporate, or be otherwise accompanied by, any of a variety of types of light source 111 (e.g., a broad spectrum light source, single frequency light source, collimated light source, etc.—not specifically shown) that may serve to illuminate the surface 771 and/or 881 of an object 700 and/or a security token 800 the within the FOV of the scanning engine 110 in a manner that enhances the ability of the scanning component 113 to capture an image of a portion of that surface 771 and/or 881, respectively.

The objects 700 on which encoded data markings 773 may be carried may each be any of a variety of objects, including and not limited to, a package carrying a shipping label that includes encoded data marking(s), or a product for sale within retail packaging on which encoded data marking(s) are printed as part of the graphical artwork thereof. Similarly, the security tokens 800 on which encoded data 883 may be carried for being optically scanned may each be any of a variety of objects that may be carried on by an authorized user among authorized personnel, including and not limited to, a card, a badge, a bracelet, a necklace, a wristwatch, a tattoo, etc.

The data encoded within the encoded data markings 773 may include, and not be limited to, data indicating the addresses of a sender and/or intended recipient of a package, or data providing a universal product code (UPC) that uniquely identifies a product for sale. The data encoded within the encoded data markings 883 may include any of a variety of types of data value that may be used as a security credential, including and not limited to, a randomly generated data value, a hash or otherwise encrypted form of a piece of data associated with a particular authorized user, etc.

Each encoded data marking 773 and/or 883 that is implemented as an indicia may be any of a variety of forms of 1D optically readable indicia (e.g., a barcode) or 2D optically readable indicia (e.g., a QR code), including and not limited to, one or more of Codabar; Code 25 (Interleaved); Code 25 (Non-interleaved); Code 11; Code 39; Code 93; Code 128; CPC Binary; DUN 14; EAN 2; EAN 5; EAN-8, EAN-13; Facing Identification Mark; GS1-128; GS1 DataBar; HIBC; Intelligent Mail barcode; ITF-14; JAN; KarTrak ACI; Latent image barcode; MSI; Pharmacode; PLANET; Plessey; Post-Bar; POSTNET; RM4SCC/KIX; Telepen; UPC; Aztec Code; Code 1; ColorCode; Color Construct Code; Cronto-Sign; CyberCode; d-touch; DataGlyphs; Data Matrix; Datastrip Code; digital paper; EZcode; Color; High Capacity Color Barcode; HueCode; InterCode; MaxiCode; MMCC; NexCode; Nintendo e-Reader; Dotcode; PDF417; QR code; ShotCode; and SPARQCode.

In embodiments of the decoding system 1000 that include the security scanning device 300, it may be that the security scanning device 300 also incorporates a scanning engine 310 that may be similar in design, technologies and/or features to the scanning engine 110. Alternatively or additionally, and as previously discussed, other embodiments of the scanning device 100 and/or the security scanning device 300 are possible that incorporate an entirely different form of scanning engine (not specifically shown) that emits an electromagnetic field to wirelessly provide electric power to item tags 775 carried by objects 700 and/or security tags 885 carried by security tokens 800 (see FIG. 1). Again, such tags 775 and/or 885 may be implementations of RFID tags that employ the wirelessly provided electric power to wirelessly transmit data stored therein to such an alternate scanning engine.

The lock releases 120 and/or 210 may each be any of a variety of types of mechanical component, including and not limited to, a magnetically-driven or piezo-driven solenoid or other mechanical release component that enables a scanning device 100 to be separated from a corresponding cradle 200. While a scanning device 100 is locked into place with its corresponding cradle 200, the electric power that may be provided to the scanning device 100 by the charger 205 of the cradle 200 may also be used to operate the lock release 120 so as to avoid consuming electric power stored within the battery 105 to do so.

Each of the processor(s) 150 and/or 550 may each include any of a wide variety of processors, microcontrollers, gate-array logic devices, etc. that may be incorporate any of a variety of features to enhance speed and/or efficiency of processing operations. Such features may include and are not limited to, multi-threading support per core component, multiple processing core components, directly integrated memory control functionality, and/or various modes of operation by which speed of throughput and/or level of power consumption may be dynamically altered.

Each of the processor(s) 150 and/or 550 may be implemented as a single semiconductor die within a single package. Alternatively, each processor 350 may be implemented as multiple semiconductor dies incorporated into a single package, such as a multi-chip semiconductor package (e.g., a system-on-a-chip, or SOC) in which the multiple semiconductor dies may be interconnected in any of a variety of ways, including and not limited to, conductive wires extending between adjacent semiconductor dies, and/or a substrate formed from multiple layers of conductors separated by intervening layers of insulating material (e.g., a printed circuit board, or PCB) onto which the multiple semiconductor dies may be soldered.

Each of the processor(s) 150 and/or 550 may incorporate one or more core components, one or more graphics processing unit (GPU) components, and/or one or more single-instruction multiple-data (SIMD) components to provide any of a variety of processing architectures for performing any of a variety of operations. Each of the one or more ore components, the one or more GPU components, and/or the one or more SIMID components may, themselves, employ different processing architectures supporting different portions of instruction sets to perform different operations. By way of example, each of the one or more core components may support a larger and more complex instruction set than the one or more GPU components and the one or more SIMD component, and therefore, may support a wider range of operations with a relatively limited number of operands, which may include a wider range of branching instructions. In contrast, the one or more GPU components and/or the one or more SIMD components may support a smaller and less complex instruction set than the one or more core components, but may support the performance of that narrower range of operations across numerous operands at least partially in parallel. For the one or more GPU components, this may be realized through the at least partially parallel performance of the same operations on many separate pieces of data across numerous GPU cores. For the one or more SIMD components, this may realized with sets of multiple operands supported in side-by-side lanes of a set of SIMD registers. However, the one or more GPU components, and the one or more the SIMD components may not support branching instructions. As a result, in executing instructions, the operation and use of the one or more GPU components and/or of the one or more SIMD component may be controlled by the one or more core components.

The storages 160 and/or 560 may be based on any of a variety of volatile storage technologies, including and are not limited to, random-access memory (RAM), dynamic RAM (DRAM), Double-Data-Rate DRAM (DDR-DRAM), synchronous DRAM (SDRAM), static RAM (SRAM), etc. Alternatively or additionally, the storage 160 may be based on any of a variety of non-volatile storage technologies.

The one or more manually-operable controls 170 may be include any of a wide variety of input components that able to be manually operated (e.g., operated with one or more digits of a hand), including and not limited to, buttons, lever and/or rocker switches, force-sensitive transducers, optical and/or ultrasound-based motion sensors, touch-sensitive and/or proximity-sensitive solid state input devices, rotary dial control, slide lever controls, etc. The display 180 may be based on any of a wide variety of display technologies, including and not limited to, a liquid crystal display (LCD), an electro-luminescent (EL) display, a gas plasma display, a light-emitting diode (LED) display, etc. Each of such technologies may be used to provide a two-dimensional (2D) array of pixels that may be selectively illuminated and/or configured with a selectable color to display any of a variety of images, including photographic images, animated images, computer-generated graphical images, textual images, etc. In some embodiments, it may be that the manually-operable controls 170 and the display 180 are combined such that the display 180 is a touch screen.

The network interfaces 190 and/or 590 may employ any of a variety of wireless communications technologies, including and not limited to, radio frequency transmission, transmission incorporated into electromagnetic fields by which electric power may be wirelessly conveyed, and/or any of a variety of types of optical transmission. Additionally, the network interfaces 190 and/or 590 may be configured to engage in communications that adhere in timings, protocol and/or in other aspects to one or more known and widely used standards, including and not limited to IEEE 802.11a, 802.11ad, 802.11ah, 802.11ax, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1×RTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

Figure 6B:
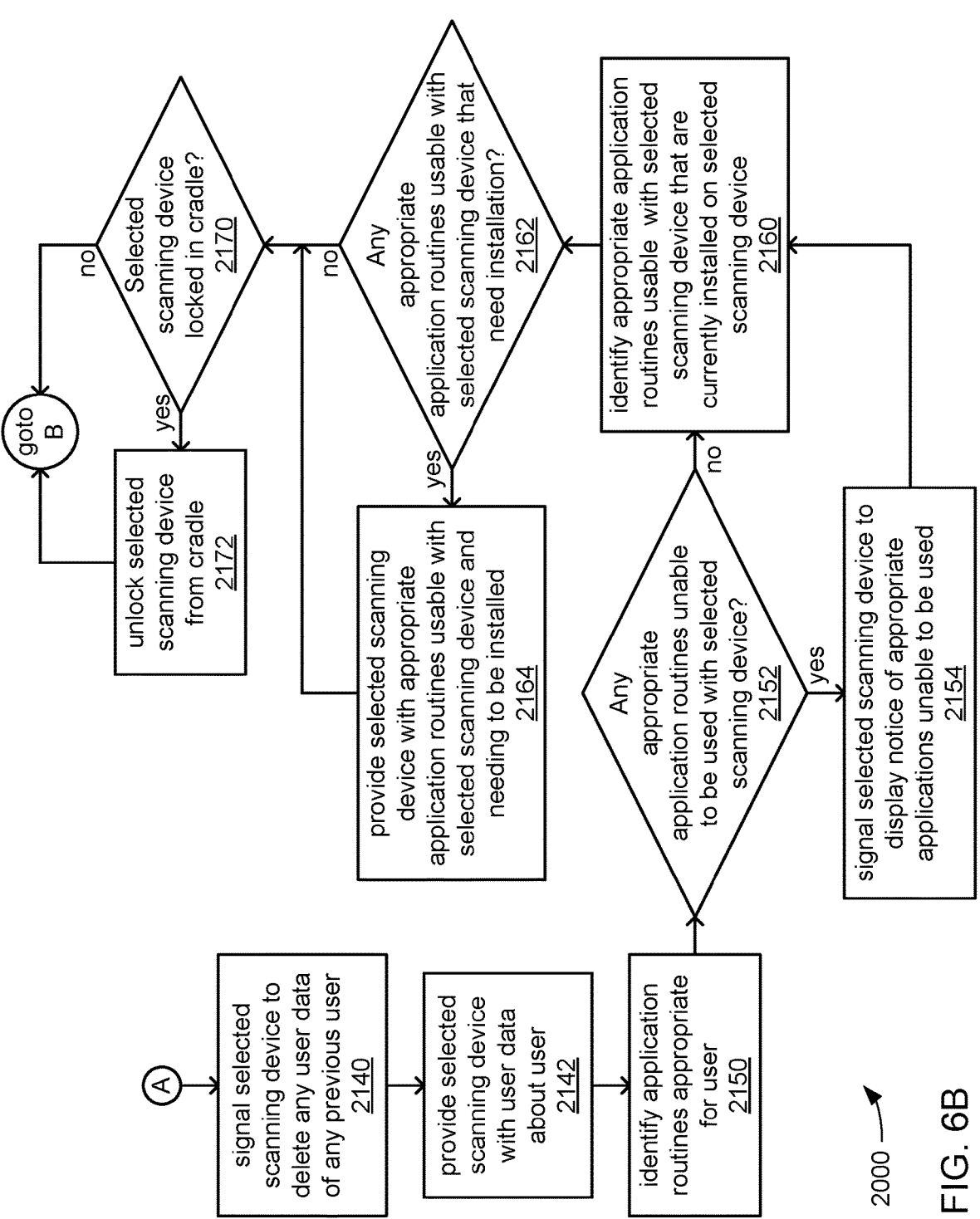

FIGS. 6A through 6B, together, provide a flow chart of operation of a control device of the decoding system 1000 to allocate a scanning device.

Starting with FIG. 6A, at 2110, processor(s) of a control device may be caused by the execution of a control routine to monitor a network for the receipt of an indication of a scan of security indicia from either a security scanning device or from a scanning device. If an indication of a scan is received at 2112, but it is not the scan of a security indicia, then the processor(s) of the control device may return to monitoring the network at 2110.

However, if at 2112, a security scan is received, then the processor(s) of the control device may attempt to validate the security indicia at 2114. If validation is unsuccessful at 2116, then monitoring of the network may resume at 2110.

However, if at 2116, the validation of the security indicia is successful, then at 2120, the processor(s) of the control device may identify which scanning device(s) are currently available. Also, from among the identified available scanning devices, the processor(s) may identify the scanning device(s) that are most appropriate for the user. As has been discussed, whether a particular scanning device is appropriate for a particular user may be based on what functions the user is authorized to perform, and what model(s) of scanning device have the features required to enable the performance of those functions.

If, at 2122, a specific scanning device is requested by the user as a result of using the requested scanning device to scan the security indicia, then the processor(s) of the control device may determine at 2130 whether the requested scanning device is among those that are appropriate for use by the user. If so, then at 2132, the scanning device requested by the user by employing it to scan their security token may be selected to be allocated to the user. Otherwise, if the requested scanning device is not appropriate for use by the user, then monitoring the network for the receipt of a scan of a security indicia may resume at 2110.

However, if at 2122, no specific scanning device is requested by the user (e.g., the user used a security scanning device to scan their security credential), then the processor(s) of the control device may determine at 2124 whether there is an appropriate scanning device available. If so, then at 2126, an appropriate scanning device for the user is selected from the ones that were identified as available and appropriate. Otherwise, if their currently is no available appropriate scanning device, then monitoring the network for the receipt of a scan of a security indicia may resume at 2110.

Turning to FIG. 6B, at 2140, the processor(s) of the control device may transmit a command to selected scanning device to delete any data that may still be stored therein that is associated with a previous user of that scanning device. At 2142, data associated with the user that the selected scanning device is being allocated to may then be transmitted to the selected scanning device.

At 2150, the processor(s) of the control device may identify what application routines are appropriate to provide to the user based on what functions the user is authorized to perform. At 2152, the processor(s) may determine whether any of those application routines are unable to be used with the selected scanning device. If not, then at 2160, the processor(s) may identify which one(s) of those application routines are already installed on the selected scanning device. However, if there are ones of those application routines that cannot be used with the selected scanning device, then at 2154, and before 2160, the processor(s) may transmit a command to the selected scanning device to operate a display thereof to present a notice to the user of there being one or more application routines that cannot be used with the selected scanner.

At 2162, the processor(s) of the control device may determine whether there are any application routines that are usable with the selected scanning device, but which are not currently installed on the selected scanning device. If not, then the processor(s) may check, at 2170, whether the selected scanning device is locked in a cradle. However, if so, then at 2164, those application routine(s) may be downloaded from the control device and into the storage of the selected scanning device for installation therein, before the check is made at 2170.

If, at 2170, the selected scanning device is not locked in a cradle, then the selected scanning device is already in condition for use by the user, and the processor(s) of the control device may return to monitoring the network at 2110. However, if at 2170, the selected scanning device is locked in a cradle, then a command may be transmitted to the selected scanning device to unlock the scanning device from its cradle, before returning to monitoring the network 2110.

Figure 7A:
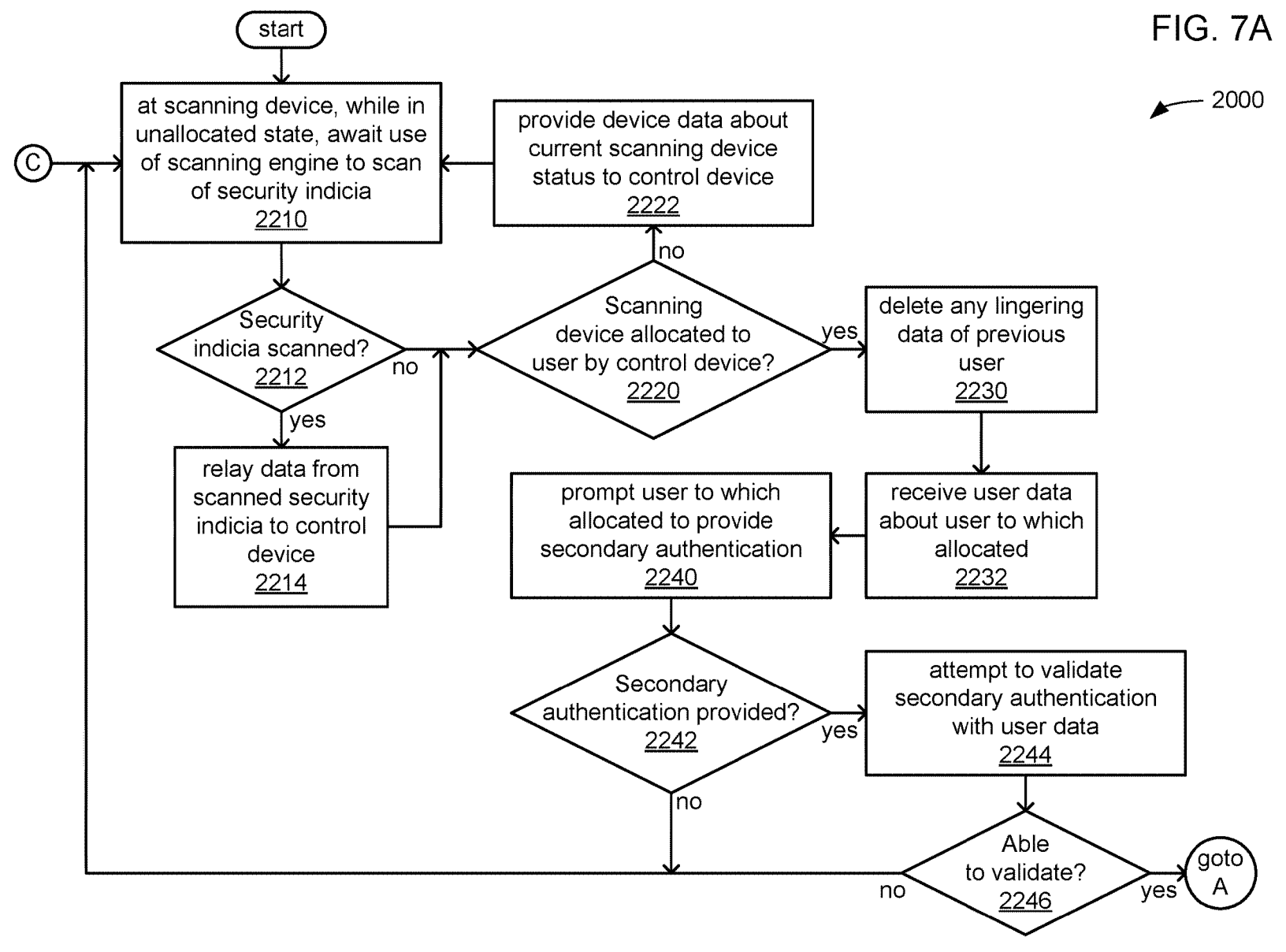
Figure 7B:
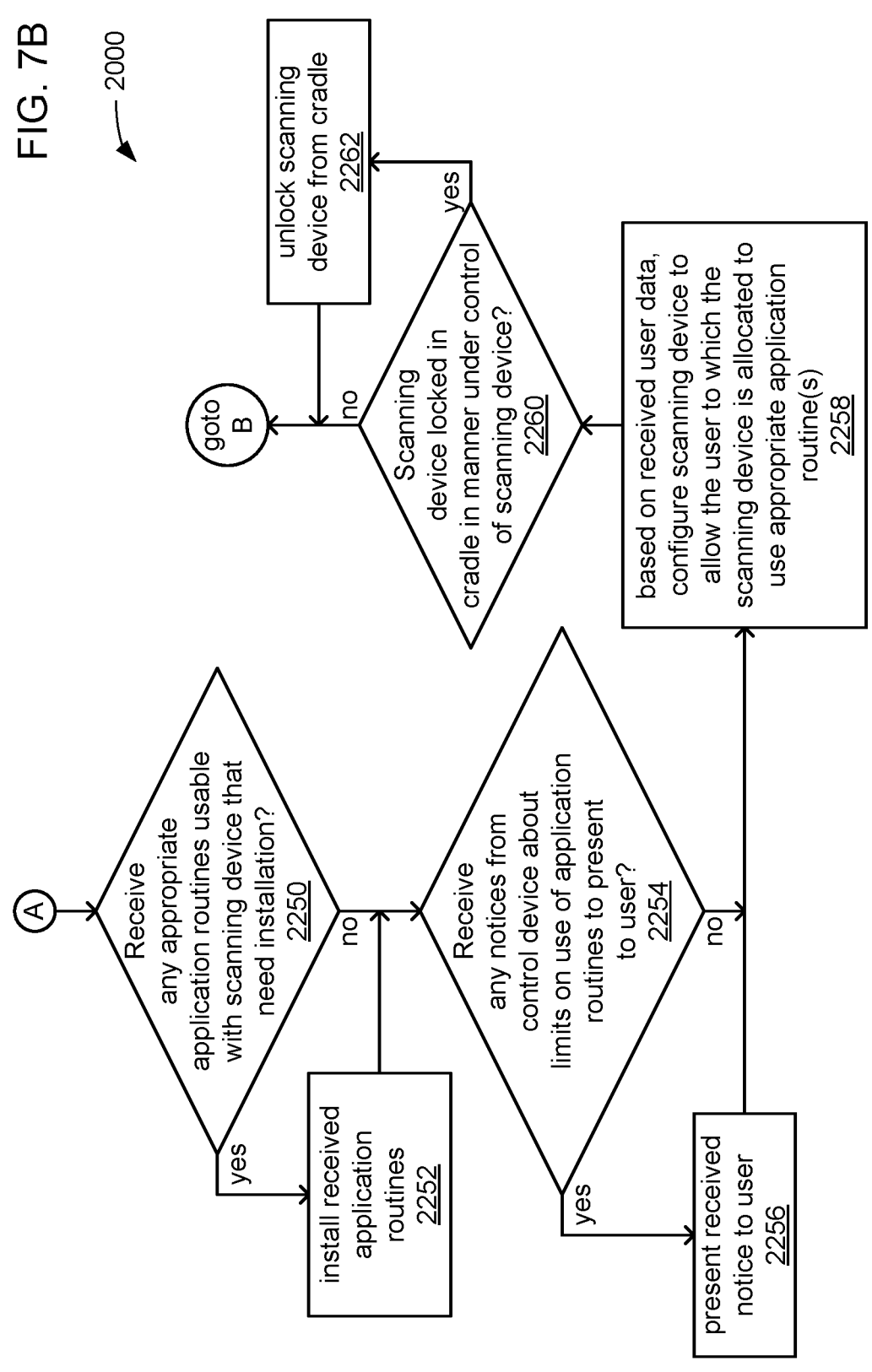
Figure 7C:
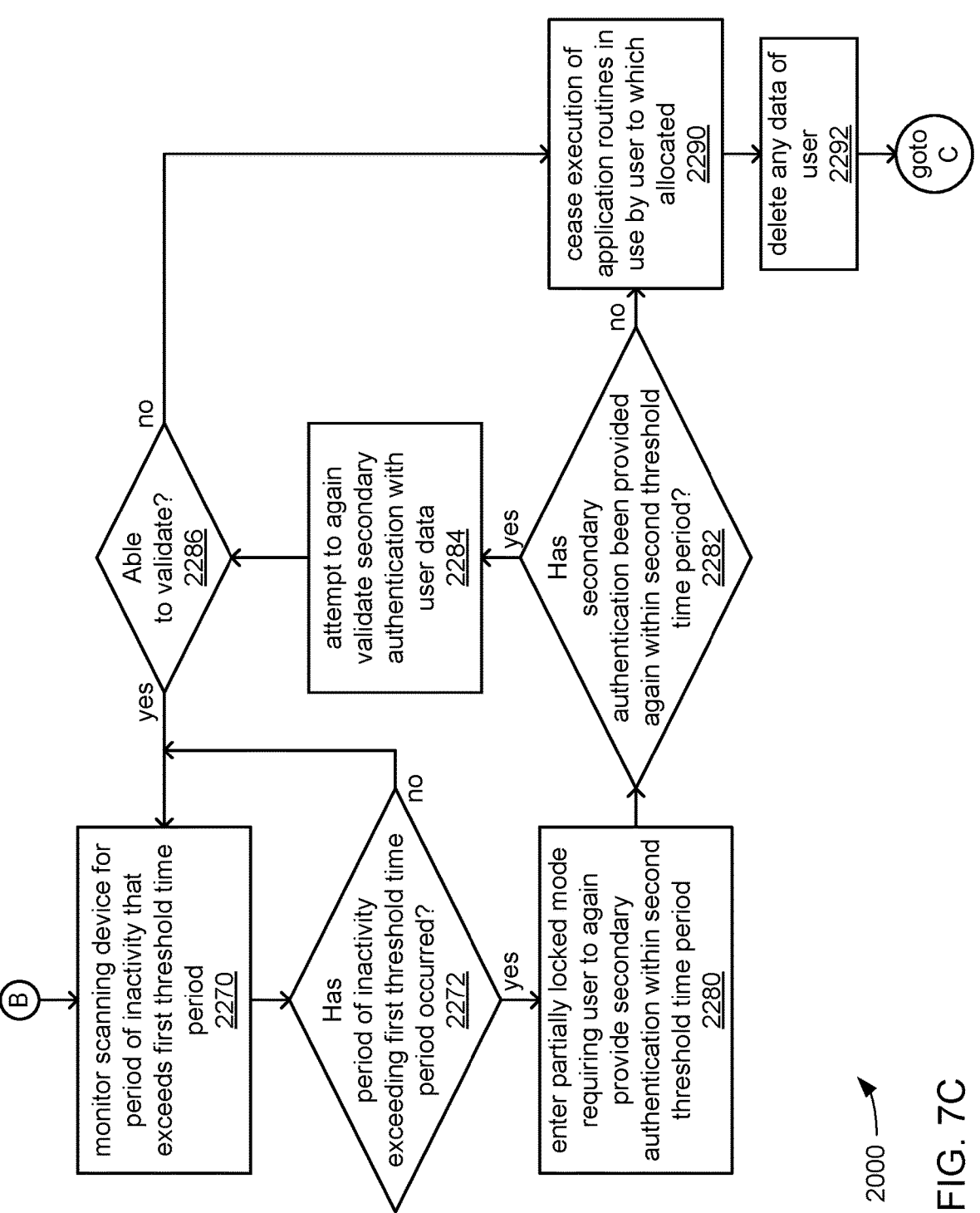

FIGS. 7A through 7C, together, provide a flow chart of operation of a scanning device of the decoding system 1000 to control allocation thereof.

Starting with FIG. 7A, at 2210, while the scanning device is in an unallocated state in which the scanning device is not allocated to a user, processor(s) of the scanning device may be caused by the execution of a control routine to await use of the scanning engine of the scanning device to scan a security indicia carried by a security token.

If, at 2212, the processor(s) of the scanning device detect that the scanning engine has been used to scan an indicia, and it is a security indicia, then the processor(s) may relay data decoded from the security indicia to a control device at 2214. At 2220, regardless of the type of indicia that has been scanned, the processor(s) may check whether the control device has yet allocated the scanning device to a user. If not, then at 2222, the processor(s) may transmit data about the current status of the scanning device to the control device before returning to awaiting use of the scanning engine to scan a security indicia at 2210.

However, if at 2220, the control device has allocated the scanning device to a user, then at 2230, the processor(s) of the scanning device may delete any lingering data still stored within the scanning device that is associated with a previous user of the scanning device. Then, at 2232, user data concerning the user to which the scanning device has now been allocated may be received at the scanning device.

At 2240, the processor(s) of the scanning device may operate a display of the scanning device to present a prompt to the user to provide a secondary form of authentication (e.g., a password or a scan of a fingerprint) as part of an implementation of two-factor authentication. If, at 2242, no secondary authentication is provided, then the processor(s) may return to awaiting use of the scanning engine to scan a security indicia at 2210.

However, if at 2242, a secondary authentication is provided, then the processor(s) may attempt to validate the secondary authentication at 2244. If, at 2246, the secondary authentication cannot not be validated, then the processor(s) may return to awaiting use of the scanning engine to scan a security indicia at 2210.

Turning to FIG. 7B, however, if at 2246, the secondary authentication is validated, then the processor(s) of the scanning device may check, at 2250, whether any application routines that are usable with the scanning device, and that need to be installed within the scanning device, have been received. If so, then at 2252, the processor(s) may install such received application routine(s).

At 2254, the processor(s) of the scanning device may check whether any indications have been received from the control device about a need to present, to the user, a notice concerning limits on the use of an application routine. If so, then at 2256, the processor(s) may operate a display of the scanning device to present such a notice.

At 2258, based on indications, in the received user data, concerning what application routines the user is authorized to use, the processor(s) of the scanning device may configure the scanning device to enable the user to use the application routines that are appropriate for the user to use.

At 2260, the processor(s) of the scanning device may check whether the scanning device is locked in a cradle in a manner in which the scanning device is able to unlock itself therefrom. If so, then at 2262, the processor(s) may operate a lock release of the scanning device to unlock the scanning device from the cradle.

At 2270, the processor(s) of the scanning device may monitor the use of the scanning device for an occurrence of a period of inactivity that exceeds a first threshold time period. At 2272, if such a period of inactivity has occurred, then the processor(s) may place the scanning device in a partially locked mode that requires the user to again provide the secondary authentication within a second threshold period of time.

At 2282, if the secondary authentication has been provided within the second threshold period of time, then the processor(s) of the scanning device may attempt to again validate the secondary authentication with the user data received from the control device. If, at 2286, the validation is successful, then the scanning device may be returned to an unlocked state in which the processor(s) again monitor for a period of inactivity at 2270.

However, if at 2282, the secondary authentication has not been provided within the second threshold time period, then at 2290, the processor(s) of the scanning device may cease the execution of the application routines associated with the user to which the scanning device was allocated. Then, at 2292, the processor(s) may delete any data stored within the scanning device that is associated with the user before returning to awaiting use of the scanning engine to scan a security indicia at 2210.

There is thus disclosed a decoding device and method for capturing and decoding an encoded data marking that includes providing a UI that enables the use of a touch screen in place of a mechanical depressible button.

A control device includes a first storage configured to store a user data set including: authorizations granted to each user of a set of users to use at least a subset of scanning devices of a set of scanning devices, wherein each scanning device of the set of scanning devices is capable of performing at least one of optical scanning of indicia and radio frequency (RF) scanning of radio frequency identification (RFID) tags; and authorizations granted to each user of the set of users to use at least a subset of application routines and communication features from among a set of application routines and communication features of each scanning device of the corresponding subset of scanning devices. The control device also includes a first processor communicatively coupled to the first storage, the first processor configured to perform operations including: receive indications of current status of the set of scanning devices; receive an indication of an occurrence of scanning of a security token comprising at least one of a security indicia able to be optically scanned and a security tag able to be RF scanned, wherein the at least one of the security indicia and the security tag comprises encoded data associated with a user; and attempt to use the user data set to authenticate the encoded data. The first processor is also configured to, in response to successful authentication of the encoded data, perform operations including: use the user data set to identify a scanning device of the set of scanning devices that the user is authorized to use; and transmit, from the control device and to the identified scanning device, at least an indication of the subset of application routines and communication features that the user data set indicates that the user is authorized to use to cause the identified scanning device to transition to an allocated state in which the identified scanning device is allocated to be used by the user, and restrict the user to using the subset of application routines and communication features on the identified scanning device.

The user data set further may include a specification of a form of secondary authentication of the user; and the first processor may be further configured to transmit, from the control device and to the identified scanning device, an indication of the form of secondary authentication to cause the identified scanning device to require that the user provide the secondary authentication to the identified scanning device to be permitted to use the identified scanning device.

The identified scanning device may include: a second storage configured to store data associated with the user, including the indication of the subset of application routines and communication features that the user is authorized to use; and a second processor communicatively coupled to the second storage. The second processor may be configured to perform operations including: monitor for an occurrence of lack of use of the identified scanning device by the user for a period of time that exceeds a first threshold period of time, or that exceeds a second threshold period of time that is longer than the first threshold period of time; in response to the occurrence of lack of use for a period of time that exceeds the first threshold period of time, impose a requirement that the user must again provide the secondary authentication to the identified scanning device to be permitted to use the identified scanning device; and in response to the occurrence of lack of use for a period of time that exceeds the second threshold period of time, perform operations including cause the identified scanning device to transition to an unallocated state in which the identified scanning device is not allocated to be used, and delete the data associated with the user from the second storage.

The user data set may further include a specification of a subset of application data that the user is authorized to access through at least one of an application routine and a communication feature of the subset of application routines and communication features on the identified scanning device; and the first processor may be further configured to transmit, from the control device and to the identified scanning device, an indication of the subset of application data to cause the identified scanning device to restrict the user to accessing the subset of the application data through the at least one of an application routine and a communication feature.

The user data set may further include a specification of a manner of customizing at least one aspect of an application routine or a communication feature of the subset of application routines and communication features that the user is authorized to use; and the first processor may be further configured to transmit, from the control device and to the identified scanning device, an indication of the manner of customization to cause the identified scanning device to effect the manner of customization of the at least one aspect of an application routine or a communication feature.

The indications of current status of the set of scanning devices may include indications whether of each application routine of the set of application routines and communication features is currently installed on each scanning device of the set of scanning devices. The first processor may be further configured to perform operations including: use the indications of current status of the set of scanning devices to determine whether each application routine of the subset of application routines and communication features that the user is authorized to use is installed on the identified scanning device; and in response to a determination that an application routine of the subset of application routines and communication features is not installed on the identified scanning device, transmit, from the control device and to the identified scanning device, a copy of the application routine to cause the identified scanning device to install the application routine thereon.

The indications of current status of the set of scanning devices may include indications of ability of each scanning device of the set of scanning devices to support use of each application routine of the set of application routines and communication features. The first processor may be further configured to perform operations including: use the indications of current status of the set of scanning devices to determine whether the identified scanning device is able to support the execution of each application routine of the subset of application routines and communication features that the user is authorized to use; and in response to a determination that the identified scanning device is unable to support execution of an application routine of the subset of application routines and communication features, transmit, from the control device and to the identified scanning device, a command to provide the user an indication that use of the application routine on the identified scanning device is not supported.

The scanning of the security token may be performed by a security scanning device not included in the set of scanning devices; the first processor may be further configured to restrict the scanning of security tokens associated with the set of users to the security scanning device; and the indications of current status of the set of scanning devices may include indications of whether each scanning device of the set of scanning devices is currently allocated for use. Identifying a scanning device of the set of scanning devices that the user is authorized to use may include performing operations including: using the indications of current status of the set of scanning devices and the user data set to identify a subset of the scanning devices of the set of scanning devices that is currently unallocated and that the user is authorized to use; and selecting the identified scanning device from the subset of the scanning devices of the set of scanning devices.

The first processor may be further configured to permit the scanning of security tokens associated with the set of users to be performed using each of the scanning devices of the set of scanning devices; and the scanning of the security tokens may be performed by one of the scanning devices of the set of scanning devices. Identifying a scanning device of the set of scanning devices that the user is authorized to use comprises performing operations including: using the user data to determine whether the user is authorized to use the one of the scanning devices used to scan the security token; and in response to a determination that the user is authorized to use the one of the scanning devices, selecting the one of the scanning devices as the identified scanning device.

Each scanning device of the set of scanning devices that is currently unallocated for use may be able to be stored within a cradle of a set of cradles to enable a battery of the scanning device to be recharged; each scanning device of the set of scanning devices that is stored within a cradle of the set of cradles may be able to be locked to the cradle until allocated for use; and the first processor may be further configured to, in response to successful authentication of the encoded data from the scan of the security token, transmit, from the control device, and to the identified scanning device or to a cradle of the set of cradles to which the identified scanning device is locked, a command to unlock the identified scanning device from the cradle.

A method includes: receiving, at a control device, by a first processor of a control device, and from a set of scanning devices, indications of current status of the set of scanning devices, wherein each scanning device of the set of scanning devices is capable of performing at least one of optical scanning of indicia and radio frequency (RF) scanning of radio frequency identification (RFID) tags; and receiving, at the control device and by the first processor, an indication of an occurrence of scanning of a security token comprising at least one of a security indicia able to be optically scanned and a security tag able to be RF scanned, wherein the at least one of the security indicia and the security tag comprises encoded data associated with a user. The method also includes attempting, by the first processor, to use a user data set to authenticate the encoded data, wherein the user data set is stored within a first storage communicatively coupled to the first processor, and the user data set includes: authorizations granted to each user of a set of users to use at least a subset of scanning devices of a set of scanning devices; and authorizations granted to each user of the set of users to use at least a subset of application routines and communication features from among a set of application routines and communication features of the corresponding subset of scanning devices. The method further includes, in response to successful authentication of the encoded data, performing operations including: using, by the first processor, the user data set to identify a scanning device of the set of scanning devices that the user is authorized to use; and transmitting, from the control device and to the identified scanning device, at least an indication of the subset of application routines and communication features that the user data set indicates that the user is authorized to use to cause the identified scanning device to transition to an allocated state in which the identified scanning device is allocated to be used by the user, and restrict the user to using the subset of application routines and communication features on the identified scanning device.

The user data set may further include a specification of a form of secondary authentication of the user; and the method may further include transmitting, from the control device and to the identified scanning device, an indication of the form of secondary authentication to cause the identified scanning device to require that the user provide the secondary authentication to the identified scanning device be permitted to use the identified scanning device.

The method may further include: monitoring, at the identified scanning device, and by a second processor of the identified scanning device, for an occurrence of lack of use of the identified scanning device by the user for a period of time that exceeds a first threshold period of time, or that exceeds a second threshold period of time that is longer than the first threshold period of time; and in response to the occurrence of lack of use for a period of time that exceeds the first threshold period of time, imposing, by the second processor, a requirement that the user must again provide the secondary authentication to the identified scanning device, to be permitted to use the identified scanning device. The method may further include, in response to the occurrence of lack of use for a period of time that exceeds the second threshold period of time, performing operations including: causing, by the second processor, the identified scanning device to transition to an unallocated state in which the identified scanning device is not allocated to be used; and deleting, by the second processor, and from a second storage communicatively coupled to the second processor, the data associated with the user.

The user data set may further include a specification of a subset of application data that the user is authorized to access through at least one of an application routine and a communication feature of the subset of application routines and communication features on the identified scanning device; and the method may further include transmitting, from the control device and to the identified scanning device, an indication of the subset of application data to cause the identified scanning device to restrict the user to accessing the subset of the application data through the at least one of an application routine and a communication feature.

The user data set may further include a specification of a manner of customizing at least one aspect of an application routine or a communication feature of the subset of application routines and communication features that the user is authorized to use; and the method may further include transmitting, from the control device and to the identified scanning device, an indication of the manner of customization to cause the identified scanning device to effect the manner of customization of the at least one aspect of an application routine or a communication feature.

The indications of current status of the set of scanning devices may include indications of whether each application routine of the set of application routines and communication features is currently installed on each scanning device of the set of scanning devices, and the method may further include: using, by the first processor, the indications of current status of the set of scanning devices to determine whether each application routine of the subset of application routines and communication features that the user is authorized to use is installed on the identified scanning device; and in response to a determination that an application routine of the subset of application routines and communication features is not installed on the identified scanning device, transmitting, from the control device and to the identified scanning device, a copy of the application routine to cause the identified scanning device to install the application routine thereon.

The indications of current status of the set of scanning devices may include indications of ability of each scanning device of the set of scanning devices to support execution of each application routine of the set of application routines and communication features, and the method may further include: using, by the first processor, the indications of current status of the set of scanning devices to determine whether the identified scanning device is able to support the execution of each application routine of the subset of application routines and communication features that the user is authorized to use; and in response to a determination that the identified scanning device is unable to support execution of an application routine of the subset of application routines and communication features, transmitting, from the control device and to the identified scanning device, a command to provide the user an indication that use of the application routine on the identified scanning device is not supported.

The scanning of the security token may be performed by a security scanning device not included in the set of scanning devices; the method may further include restricting, by the first processor, the scanning of security tokens associated with the set of users to the security scanning device; and the indications of current status of the set of scanning devices may include indications of whether each scanning device of the set of scanning devices is currently allocated for use. Identifying a scanning device of the set of scanning devices that the user is authorized to use may include performing operations including: using, by the first processor, the indications of current status of the set of scanning devices and the user data set to identify a subset of the scanning devices of the set of scanning devices that is currently unallocated and that the user is authorized to use; and selecting, by the first processor, the identified scanning device from the subset of the scanning devices of the set of scanning devices.

The method may further include permitting, by the first processor, the scanning of security tokens associated with the set of users to be performed using each of the scanning devices of the set of scanning devices; and the scanning of the user indicia may be performed by one of the scanning devices of the set of scanning devices. Identifying a scanning device of the set of scanning devices that the user is authorized to use may include performing operations including: using, by the first processor, the user data to determine whether the user is authorized to use the one of the scanning devices used to scan the security token; and in response to a determination that the user is authorized to use the one of the scanning devices, selecting, by the first processor, the one of the scanning devices as the identified scanning device.

Each scanning device of the set of scanning devices that is currently unallocated for use may be able to be stored within a cradle of a set of cradles to enable a battery of the scanning device to be recharged; each scanning device of the set of scanning devices that is stored within a cradle of the set of cradles may be able to be locked to the cradle until allocated for use; and the method may further include, in response to successful authentication of the encoded data from the scan of the security token, transmitting, from the control device, and to the identified scanning device or to a cradle of the set of cradles to which the identified scanning device is locked, a signal to unlock the identified scanning device from the cradle.

The invention claimed is:

1. A control device comprising:
a first storage configured to store a user data set comprising:
  authorizations granted to each user of a set of users to use at least a subset of scanning devices of a set of scanning devices, wherein each scanning device of the set of scanning devices is capable of performing at least one of optical scanning of indicia and radio frequency (RF) scanning of radio frequency identification (RFID) tags; and
  authorizations granted to each user of the set of users to use at least a subset of application routines and communication features from among a set of application routines and communication features of each scanning device of the corresponding subset of scanning devices;
a first processor communicatively coupled to the first storage, the first processor configured to perform operations comprising:
  receive indications of current status of the set of scanning devices;
  receive an indication of an occurrence of scanning of a security token comprising at least one of a security indicia able to be optically scanned and a security tag able to be RF scanned, wherein the at least one of the security indicia and the security tag comprises encoded data associated with a user;
  attempt to use the user data set to authenticate the encoded data; and
  in response to successful authentication of the encoded data, perform operations comprising:
    use the user data set to identify a scanning device of the set of scanning devices that the user is authorized to use; and
    transmit, from the control device and to the identified scanning device, at least an indication of the subset of application routines and communication features that the user data set indicates that the user is authorized to use to cause the identified scanning device to:

transition to an allocated state in which the identified scanning device is allocated to be used by the user; and restrict the user to using the subset of application routines and communication features on the identified scanning device, wherein:

the user data set further comprises a specification of a form of secondary authentication of the user; and the first processor is further configured to transmit, from the control device and to the identified scanning device, an indication of the form of secondary authentication to cause the identified scanning device to require that the user provide the secondary authentication to the identified scanning device to be permitted to use the identified scanning device.

2. The control device of claim 1, wherein:

the identified scanning device comprises:

a second storage configured to store data associated with the user, including the indication of the subset of application routines and communication features that the user is authorized to use; and a second processor communicatively coupled to the second storage; and the second processor is configured to perform operations comprising:

monitor for an occurrence of lack of use of the identified scanning device by the user for a period of time that exceeds a first threshold period of time, or that exceeds a second threshold period of time that is longer than the first threshold period of time;

in response to the occurrence of lack of use for a period of time that exceeds the first threshold period of time, impose a requirement that the user must again provide the secondary authentication to the identified scanning device to be permitted to use the identified scanning device; and in response to the occurrence of lack of use for a period of time that exceeds the second threshold period of time, perform operations comprising:

cause the identified scanning device to transition to an unallocated state in which the identified scanning device is not allocated to be used; and delete the data associated with the user from the second storage.

3. The control device of claim 1, wherein:

the user data set further comprises a specification of a subset of application data that the user is authorized to access through at least one of an application routine and a communication feature of the subset of application routines and communication features on the identified scanning device; and the first processor is further configured to transmit, from the control device and to the identified scanning device, an indication of the subset of application data to cause the identified scanning device to restrict the user to accessing the subset of the application data through the at least one of an application routine and a communication feature.

4. The control device of claim 1, wherein:

the user data set further comprises a specification of a manner of customizing at least one aspect of an application routine or a communication feature of the subset of application routines and communication features that the user is authorized to use; and the first processor is further configured to transmit, from the control device and to the identified scanning device, an indication of the manner of customization to cause the identified scanning device to effect the manner of customization of the at least one aspect of an application routine or a communication feature.

5. The control device of claim 1, wherein:

the indications of current status of the set of scanning devices comprises indications whether of each application routine of the set of application routines and communication features is currently installed on each scanning device of the set of scanning devices; and the first processor is further configured to perform operations comprising:

use the indications of current status of the set of scanning devices to determine whether each application routine of the subset of application routines and communication features that the user is authorized to use is installed on the identified scanning device; and in response to a determination that an application routine of the subset of application routines and communication features is not installed on the identified scanning device, transmit, from the control device and to the identified scanning device, a copy of the application routine to cause the identified scanning device to install the application routine thereon.

6. The control device of claim 1, wherein:

the scanning of the security token is performed by a security scanning device not included in the set of scanning devices;

the first processor is further configured to restrict the scanning of security tokens associated with the set of users to the security scanning device;

the indications of current status of the set of scanning devices comprises indications of whether each scanning device of the set of scanning devices is currently allocated for use; and identifying a scanning device of the set of scanning devices that the user is authorized to use comprises performing operations comprising:

using the indications of current status of the set of scanning devices and the user data set to identify a subset of the scanning devices of the set of scanning devices that is currently unallocated and that the user is authorized to use; and selecting the identified scanning device from the subset of the scanning devices of the set of scanning devices.

7. The control device of claim 1, wherein:

the first processor is further configured to permit the scanning of security tokens associated with the set of users to be performed using each of the scanning devices of the set of scanning devices;

the scanning of the security tokens is performed by one of the scanning devices of the set of scanning devices; and identifying a scanning device of the set of scanning devices that the user is authorized to use comprises performing operations comprising:

using the user data to determine whether the user is authorized to use the one of the scanning devices used to scan the security token; and in response to a determination that the user is authorized to use the one of the scanning devices, selecting the one of the scanning devices as the identified scanning device.

8. The control device of claim 1, wherein:

each scanning device of the set of scanning devices that is currently unallocated for use is able to be stored within a cradle of a set of cradles to enable a battery of the scanning device to be recharged;

each scanning device of the set of scanning devices that is stored within a cradle of the set of cradles is able to be locked to the cradle until allocated for use; and the first processor is further configured to, in response to successful authentication of the encoded data from the scan of the security token, transmit, from the control device, and to the identified scanning device or to a cradle of the set of cradles to which the identified scanning device is locked, a command to unlock the identified scanning device from the cradle.

9. The control device of claim 1, wherein:

the identified scanning device comprises:

a second storage configured to store data associated with the user, including the indication of the subset of application routines and communication features that the user is authorized to use; and a second processor communicatively coupled to the second storage; and the second processor is configured to perform operations comprising:

delete any lingering data still stored within the scanning second storage that is associated with a previous user of the scanning device responsive to the scanning device to being allocated to a current user.

10. A control device comprising:

a first storage configured to store a user data set comprising:

authorizations granted to each user of a set of users to use at least a subset of scanning devices of a set of scanning devices, wherein each scanning device of the set of scanning devices is capable of performing at least one of optical scanning of indicia and radio frequency (RF) scanning of radio frequency identification (RFID) tags; and authorizations granted to each user of the set of users to use at least a subset of application routines and communication features from among a set of application routines and communication features of each scanning device of the corresponding subset of scanning devices;

a first processor communicatively coupled to the first storage, the first processor configured to perform operations comprising:

receive indications of current status of the set of scanning devices;

receive an indication of an occurrence of scanning of a security token comprising at least one of a security indicia able to be optically scanned and a security tag able to be RF scanned, wherein the at least one of the security indicia and the security tag comprises encoded data associated with a user;

attempt to use the user data set to authenticate the encoded data; and in response to successful authentication of the encoded data, perform operations comprising:

use the user data set to identify a scanning device of the set of scanning devices that the user is authorized to use; and transmit, from the control device and to the identified scanning device, at least an indication of the subset of application routines and communication features that the user data set indicates that the user is authorized to use to cause the identified scanning device to:

transition to an allocated state in which the identified scanning device is allocated to be used by the user; and restrict the user to using the subset of application routines and communication features on the identified scanning device, wherein:

the indications of current status of the set of scanning devices comprises indications of ability of each scanning device of the set of scanning devices to support use of each application routine of the set of application routines and communication features; and the first processor is further configured to perform operations comprising:

use the indications of current status of the set of scanning devices to determine whether the identified scanning device is able to support the execution of each application routine of the subset of application routines and communication features that the user is authorized to use; and in response to a determination that the identified scanning device is unable to support execution of an application routine of the subset of application routines and communication features, transmit, from the control device and to the identified scanning device, a command to provide the user an indication that use of the application routine on the identified scanning device is not supported.

11. A method comprising:

receiving, at a control device, by a first processor of a control device, and from a set of scanning devices, indications of current status of the set of scanning devices, wherein each scanning device of the set of scanning devices is capable of performing at least one of optical scanning of indicia and radio frequency (RF) scanning of radio frequency identification (RFID) tags;

receiving, at the control device and by the first processor, an indication of an occurrence of scanning of a security token comprising at least one of a security indicia able to be optically scanned and a security tag able to be RF scanned, wherein the at least one of the security indicia and the security tag comprises encoded data associated with a user;

attempting, by the first processor, to use a user data set to authenticate the encoded data, wherein:

the user data set is stored within a first storage communicatively coupled to the first processor; and the user data set comprises:

authorizations granted to each user of a set of users to use at least a subset of scanning devices of a set of scanning devices; and authorizations granted to each user of the set of users to use at least a subset of application routines and communication features from among a set of application routines and communication features of the corresponding subset of scanning devices; and in response to successful authentication of the encoded data, performing operations comprising:

using, by the first processor, the user data set to identify a scanning device of the set of scanning devices that the user is authorized to use; and transmitting, from the control device and to the identified scanning device, at least an indication of the subset of application routines and communication features that the user data set indicates that the user is authorized to use to cause the identified scanning device to:

transition to an allocated state in which the identified scanning device is allocated to be used by the user; and restrict the user to using the subset of application routines and communication features on the identified scanning device, wherein:

the indications of current status of the set of scanning devices comprises indications of whether each application routine of the set of application routines and communication features is currently installed on each scanning device of the set of scanning devices; and the method further comprises:

using, by the first processor, the indications of current status of the set of scanning devices to determine whether each application routine of the subset of application routines and communication features that the user is authorized to use is installed on the identified scanning device; and in response to a determination that an application routine of the subset of application routines and communication features is not installed on the identified scanning device, transmitting, from the control device and to the identified scanning device, a copy of the application routine to cause the identified scanning device to install the application routine thereon.

12. The method of claim 11, wherein:

the user data set further comprises a specification of a form of secondary authentication of the user; and the method further comprises transmitting, from the control device and to the identified scanning device, an indication of the form of secondary authentication to cause the identified scanning device to require that the user provide the secondary authentication to the identified scanning device be permitted to use the identified scanning device.

13. The method of claim 12, comprising:

monitoring, at the identified scanning device, and by a second processor of the identified scanning device, for an occurrence of lack of use of the identified scanning device by the user for a period of time that exceeds a first threshold period of time, or that exceeds a second threshold period of time that is longer than the first threshold period of time;

in response to the occurrence of lack of use for a period of time that exceeds the first threshold period of time, imposing, by the second processor, a requirement that the user must again provide the secondary authentication to the identified scanning device, to be permitted to use the identified scanning device; and in response to the occurrence of lack of use for a period of time that exceeds the second threshold period of time, performing operations comprising:

causing, by the second processor, the identified scanning device to transition to an unallocated state in which the identified scanning device is not allocated to be used; and deleting, by the second processor, and from a second storage communicatively coupled to the second processor, the data associated with the user.

14. The method of claim 11, wherein:

the user data set further comprises a specification of a subset of application data that the user is authorized to access through at least one of an application routine and a communication feature of the subset of application routines and communication features on the identified scanning device; and the method further comprises transmitting, from the control device and to the identified scanning device, an indication of the subset of application data to cause the identified scanning device to restrict the user to accessing the subset of the application data through the at least one of an application routine and a communication feature.

15. The method of claim 11, wherein:

the user data set further comprises a specification of a manner of customizing at least one aspect of an application routine or a communication feature of the subset of application routines and communication features that the user is authorized to use; and the method further comprises transmitting, from the control device and to the identified scanning device, an indication of the manner of customization to cause the identified scanning device to effect the manner of customization of the at least one aspect of an application routine or a communication feature.

16. The method of claim 11, wherein:

the indications of current status of the set of scanning devices comprises indications of ability of each scanning device of the set of scanning devices to support execution of each application routine of the set of application routines and communication features; and the method further comprises:

using, by the first processor, the indications of current status of the set of scanning devices to determine whether the identified scanning device is able to support the execution of each application routine of the subset of application routines and communication features that the user is authorized to use; and in response to a determination that the identified scanning device is unable to support execution of an application routine of the subset of application routines and communication features, transmitting, from the control device and to the identified scanning device, a command to provide the user an indication that use of the application routine on the identified scanning device is not supported.

17. The method of claim 11, wherein:

the method further comprises permitting, by the first processor, the scanning of security tokens associated with the set of users to be performed using each of the scanning devices of the set of scanning devices;

the scanning of the user indicia is performed by one of the scanning devices of the set of scanning devices; and identifying a scanning device of the set of scanning devices that the user is authorized to use comprises performing operations comprising:

using, by the first processor, the user data to determine whether the user is authorized to use the one of the scanning devices used to scan the security token; and in response to a determination that the user is authorized to use the one of the scanning devices, selecting, by the first processor, the one of the scanning devices as the identified scanning device.

18. The method of claim 11, wherein:

each scanning device of the set of scanning devices that is currently unallocated for use is able to be stored within a cradle of a set of cradles to enable a battery of the scanning device to be recharged;

each scanning device of the set of scanning devices that is stored within a cradle of the set of cradles is able to be locked to the cradle until allocated for use; and the method further comprises, in response to successful authentication of the encoded data from the scan of the security token, transmitting, from the control device, and to the identified scanning device or to a cradle of the set of cradles to which the identified scanning device is locked, a signal to unlock the identified scanning device from the cradle.

19. A method comprising:

receiving, at a control device, by a first processor of a control device, and from a set of scanning devices, indications of current status of the set of scanning devices, wherein each scanning device of the set of scanning devices is capable of performing at least one of optical scanning of indicia and radio frequency (RF) scanning of radio frequency identification (RFID) tags;

receiving, at the control device and by the first processor, an indication of an occurrence of scanning of a security token comprising at least one of a security indicia able to be optically scanned and a security tag able to be RF scanned, wherein the at least one of the security indicia and the security tag comprises encoded data associated with a user;

attempting, by the first processor, to use a user data set to authenticate the encoded data, wherein:

the user data set is stored within a first storage communicatively coupled to the first processor; and the user data set comprises:

authorizations granted to each user of a set of users to use at least a subset of scanning devices of a set of scanning devices; and authorizations granted to each user of the set of users to use at least a subset of application routines and communication features from among a set of application routines and communication features of the corresponding subset of scanning devices; and in response to successful authentication of the encoded data, performing operations comprising:

using, by the first processor, the user data set to identify a scanning device of the set of scanning devices that the user is authorized to use; and transmitting, from the control device and to the identified scanning device, at least an indication of the subset of application routines and communication features that the user data set indicates that the user is authorized to use to cause the identified scanning device to:

transition to an allocated state in which the identified scanning device is allocated to be used by the user; and restrict the user to using the subset of application routines and communication features on the identified scanning device, wherein:

the scanning of the security token is performed by a security scanning device not included in the set of scanning devices;

the method further comprises restricting, by the first processor, the scanning of security tokens associated with the set of users to the security scanning device;

the indications of current status of the set of scanning devices comprises indications of whether each scanning device of the set of scanning devices is currently allocated for use; and identifying a scanning device of the set of scanning devices that the user is authorized to use comprises performing operations comprising:

using, by the first processor, the indications of current status of the set of scanning devices and the user data set to identify a subset of the scanning devices of the set of scanning devices that is currently unallocated and that the user is authorized to use; and selecting, by the first processor, the identified scanning device from the subset of the scanning devices of the set of scanning devices.

20. The method of claim 19, further comprising deleting any lingering data associated with a previous user of the identified scanning device responsive to the identified scanning device being allocated to the user.

* * * * *